United States Patent
Mu

(10) Patent No.: US 12,445,255 B2
(45) Date of Patent: Oct. 14, 2025

(54) METHOD FOR ADJUSTING NUMBER OF RESENDING TIMES, AND STORAGE MEDIUM

(71) Applicant: Beijing Xiaomi Mobile Software Co., Ltd., Beijing (CN)

(72) Inventor: Qin Mu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 601 days.

(21) Appl. No.: 17/774,710

(22) PCT Filed: Nov. 8, 2019

(86) PCT No.: PCT/CN2019/116804
§ 371 (c)(1),
(2) Date: May 5, 2022

(87) PCT Pub. No.: WO2021/088019
PCT Pub. Date: May 14, 2021

(65) Prior Publication Data
US 2022/0393835 A1    Dec. 8, 2022

(51) Int. Cl.
*H04L 5/00*     (2006.01)
*H04L 1/1607*   (2023.01)
*H04W 72/23*    (2023.01)

(52) U.S. Cl.
CPC .......... *H04L 5/0055* (2013.01); *H04L 1/1607* (2013.01); *H04W 72/23* (2023.01)

(58) Field of Classification Search
CPC ..... H04L 1/1607; H04L 5/0055; H04W 72/23
See application file for complete search history.

(56) References Cited

U.S. PATENT DOCUMENTS

2015/0365198 A1   12/2015  Tabet et al.
2017/0171841 A1    6/2017  Chen et al.
(Continued)

FOREIGN PATENT DOCUMENTS

| CN | 107771400 A | 3/2018 |
| CN | 108880762 A | 11/2018 |

(Continued)

OTHER PUBLICATIONS

Nokia. "Transmission in preconfigured UL resources" R1-1904168, 3GPP TSG RAN WG1 Meeting #96bis Xi'an, China, Apr. 8-12, 2019, Mar. 29, 2019;Type-A.

(Continued)

*Primary Examiner* — Sulaiman Nooristany
(74) *Attorney, Agent, or Firm* — Volpe Koenig

(57) ABSTRACT

A method for adjusting a number of resending times. The method includes: sending uplink data on the basis of an authorization-free scheduling mechanism by an user equipment; receiving a DCI issued by a base station, and when the DCI is an acknowledged ACK-DCI, determining a target number of repetitions from a first repetition number set according to repetition number indication information contained in the DCI; when the DCI is a non-acknowledged NACK-DCI, determining a target number of repetitions from a second repetition number set according to the repetition number indication information contained in the DCI; and adjusting the number of resending times for new uplink data to be subsequently on the basis of the authorization-free scheduling mechanism to the target number of repetitions.

10 Claims, 8 Drawing Sheets

(56) References Cited

U.S. PATENT DOCUMENTS

| | | | |
|---|---|---|---|
| 2018/0123765 A1* | 5/2018 | Cao | H04L 1/1819 |
| 2018/0279315 A1 | 9/2018 | Salem et al. | |
| 2018/0368117 A1 | 12/2018 | Ying et al. | |
| 2019/0021098 A1 | 1/2019 | Huang et al. | |
| 2019/0090240 A1 | 3/2019 | Ahn et al. | |
| 2021/0219329 A1* | 7/2021 | Zhou | H04L 1/1819 |

FOREIGN PATENT DOCUMENTS

| | | |
|---|---|---|
| CN | 109417444 A | 3/2019 |
| CN | 109769305 A | 5/2019 |
| CN | 110365451 A | 10/2019 |
| CN | 110419251 A | 11/2019 |
| WO | 2019/028752 A1 | 2/2019 |

OTHER PUBLICATIONS

Chinese Office Action issued on Aug. 28, 2023 for Chinese Patent Application No. 2019800029250.

Nokia, Nokia ShanghaiBell, "Preconfigured Grant forUplink transmission",3GPP TSG RAN WG1 Meeting #96bis, R1-1904177,Xi'an, China, Apr. 8-12, 2019.

Huawei, "Introduction of Rel-14 NB-IoT enhancements in 36.212" R1-1701785 , 3GPP TSG RAN WG1 Meeting #88 Athens, Greece, Type-A (Feb. 13-17, 2017).

Liao, S., "Enabling Technologies of LTE and WIFI Coexistence Networks", May 25, 2017.

Chinese Office Action issued on Nov. 14, 2022 for Chinese Patent Application No. 201980002925.0.

* cited by examiner

METHOD FOR ADJUSTING NUMBER OF RESENDING TIMES, AND STORAGE MEDIUM

CROSS REFERENCE TO RELATED APPLICATION

The present application is a U.S. National Stage of International Application No. PCT/CN2019/116804 filed on Nov. 8, 2019, the contents of all of which are incorporated herein by reference in their entireties for all purposes.

BACKGROUND

With rapid development of a 5G technology, a massive machine type communication (mMTC) service becomes one of important service types.

In the mMTC service, as for machine type communication (MTC), cellular-based narrow band Internet of Things (NB-IoT) are mostly deployed in places with a large path loss and weak network coverage, such as a basement and underground, meanwhile, hardware limit of a device leads to poor coverage capacity, and in order to guarantee a demand of normal performance, user equipment adopts a retransmission method to accumulate power, so as to achieve an effect of enhancing coverage.

SUMMARY

The present disclosure relates to the technical field of wireless communication, in particular to a method for adjusting a number of resending times, and a storage medium. The present disclosure provides a method for adjusting the number of resending times, and a storage medium. A technical solution is as follows.

According to a first aspect of the present disclosure, a method for adjusting the number of resending times is provided, is applied to user equipment of authorization-free scheduling and includes:
 sending uplink data;
 receiving downlink control information (DCI) issued by a base station, where the DCI is acknowledged ACK-DCI or non-acknowledged NACK-DCI, the ACK-DCI is used for indicating a transmission success of the uplink data, and the NACK-DCI is used for indicating a transmission failure of the uplink data;
 determining a target number of repetitions from a first repetition number set according to repetition number indication information contained in the DCI when the DCI is the acknowledged ACK-DCI;
 determining a target number of repetitions from a second repetition number set according to repetition number indication information contained in the DCI when the DCI is the non-acknowledged NACK-DCI; and adjusting the number of resending times for new uplink data to be sent subsequently to the target number of repetitions.

According to a second aspect of the present disclosure, a method for adjusting the number of resending times is provided, is applied to a base station of authorization-free scheduling and includes:
 obtaining uplink data sent by user equipment; and
 issuing downlink control information (DCI), where the DCI is acknowledged ACK-DCI or non-acknowledged NACK-DCI, the ACK-DCI is used for indicating a transmission success of the uplink data, and the NACK-DCI is used for indicating a transmission failure of the uplink data; and
 the DCI is used for indicating the user equipment to determine a target number of repetitions from a first repetition number set according to repetition number indication information contained in the DCI when the DCI is the acknowledged ACK-DCI, and
 determine a target number of repetitions from a second repetition number set according to repetition number indication information contained in the DCI when the DCI is the non-acknowledged NACK-DCI. In a possible implementation, the first repetition number set is different from the second repetition number set.

According to a third aspect of the present disclosure, an apparatus for adjusting the number of resending times is provided and includes:
 a processor, and a memory configured to store an instruction executable by the processor; where
 the processor is configured to:
 send uplink data;
 receive downlink control information (DCI) issued by a base station, where the DCI is acknowledged ACK-DCI or non-acknowledged NACK-DCI, the ACK-DCI is used for indicating a transmission success of the uplink data, and the NACK-DCI is used for indicating a transmission failure of the uplink data;
 determine a target number of repetitions from a first repetition number set according to repetition number indication information contained in the DCI when the DCI is the acknowledged ACK-DCI;
 determine a target number of repetitions from a second repetition number set according to repetition number indication information contained in the DCI when the DCI is the non-acknowledged NACK-DCI; and
 adjust the number of resending times for new uplink data to be sent subsequently to the target number of repetitions.

According to a fourth aspect of the present disclosure, an apparatus for adjusting the number of resending times is provided and includes:
 a processor, and a memory configured to store an instruction executable by the processor; where
 the processor is configured to load and execute the instruction executable to implement the method for adjusting the number of resending times in the second aspect.

According to a fifth aspect of the present disclosure, a computer non-transitory readable storage medium is provided and stores at least one instruction, at least one program, a code set or an instruction set, and the at least one instruction, the at least one program, the code set or the instruction set is loaded and executed by a processor so as to implement the method for adjusting the number of resending times in the first aspect.

According to an sixth aspect of the present disclosure, a computer non-transitory readable storage medium is provided and stores at least one instruction, at least one program, a code set or an instruction set, and the at least one instruction, the at least one program, the code set or the instruction set is loaded and executed by a processor so as to implement the method for adjusting the number of resending times in the second aspect.

It is understood that the above general description and the following detailed description are examples instead of limiting the present disclosure.

BRIEF DESCRIPTION OF THE DRAWINGS

Accompanying drawings here, which are incorporated in and constitute a part of the specification, illustrate examples consistent with the present disclosure and, together with the specification, serve to explain principles of the present disclosure.

DETAILED DESCRIPTION

Figure 1:
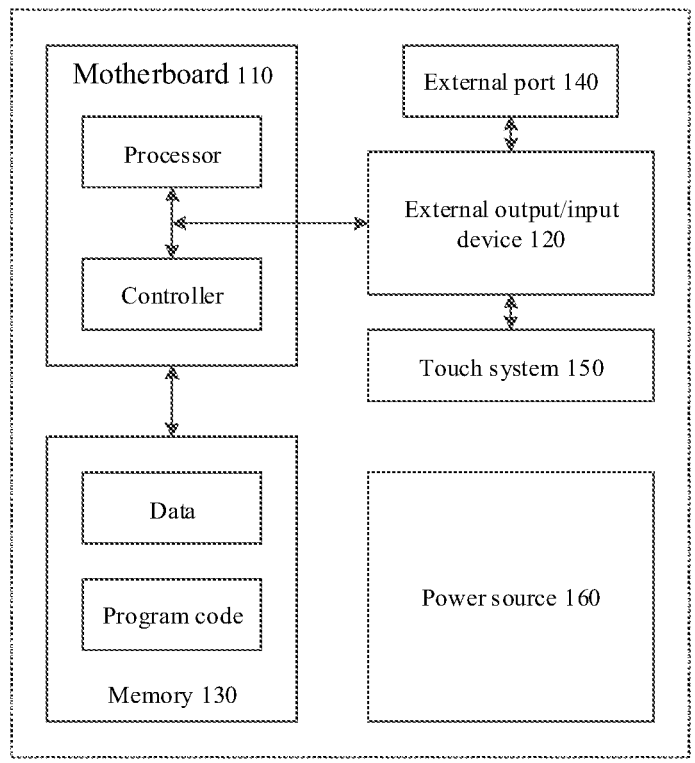
FIG. 1 illustrates a schematic structural diagram of user equipment provided by an example of the present disclosure.

In the related art, the number of retransmissions of the user equipment is fixed, so under the condition that a network side receives service data, there might be too many repetitions of the user equipment, longer transmission time is needed, consequently, communication resources are wasted, or as there are too few repetitions of the user equipment, a situation that the network side does not receive the service data is caused, unreasonable determining of the number of repetitions is caused, and the flexibility of the number of retransmissions of the user equipment is low.

Examples will be described in detail here and shown in the drawings. When the following description involves the drawings, unless otherwise indicated, the same number in the different drawings represents the same or similar element. Implementations described in the following examples do not represent all implementations consistent with the present disclosure. Rather, they are examples of an apparatus and method consistent with some aspects of the present disclosure as detailed in appended claims.

It is understood that "a plurality of" mentioned herein refers to one or more, and "more" refers to two or more than two. "And/or" which describes an association relation between associated objects indicates that there may be three relations, for example, A and/or B may indicate: only A exists, both A and B exist, and only B exists. A character "/" generally indicates that associated objects before and after it have an "or" relation.

The present disclosure provides a method for adjusting the number of resending times. The method for adjusting the number of resending times is executed by user equipment, flexible setting of the number of retransmissions of uplink data transmission of the user equipment can be realized, then a method for sending a response message of a hybrid automatic repeat request involved in the example of the present disclosure will be introduced in detail with reference to the drawings.

First, some terms involved in the present disclosure are explained.

1) Internet of Things (IoT)

IoT is a network enabling all common objects capable of realizing an independent function to realize interconnection and intercommunication on the basis of an information carrier, such as the Internet and a traditional telecommunication network. Its application field includes transport and logistics, industrial manufacturing, health care, a smart environment (home, office, factory), etc., and its market prospect is broad.

2) Machine Type Communication (MTC)

MTC is a general term of a series of techniques or a combination of the techniques for realizing autonomous data communication and information interaction between machines without manual intervention by using an automatic control technology and a network communication technology. MTC is usually called machine to machine (M2M) communication between machines. MTC has the features that the quantity of terminals is huge, a communication data volume is small, communication is timed, there is insensitivity to time delay, and movability of the terminals is low, and is an important basis of realizing applications of the Internet of Things such as a smart grid, a smart home, road safety and health management, and a ubiquitous network.

3) Cellular-Based Narrow Band Internet of Things (NB-IoT)

NB-IoT is a new technology in the field of IoT, supports cellular data connection of a low-power device in a wide area network, and is also called a lower-power wide area network (LPWAN), and NB-IoT supports efficient connection of a device with long stand-by time and higher requirement for network connection, is established in a cellular network, consumes a bandwidth of about 180 KHz and can be directly deployed in a global system for mobile communications (GSM) network, a universal mobile telecommunications system (UMTS) network or a long term evolution (LTE) network so as to reduce deployment cost and realize smooth upgrade.

4) Cellular Network

The cellular network is also called a mobile network, is a mobile communication hardware architecture and is divided into an analog cellular network and a digital cellular network. A signal coverage of all communication base stations for forming a network coverage is hexagonal and thus the whole network looks like a honeycomb.

Common cellular network types are: a GSM network (also called pcs-1900 in some countries), a code division multiple access (CDMA) network, a 3rd-generation (3G) mobile communication technology network, a frequency division multiple access (FDMA) network, a time division multiple access (TDMA) network, a parking distance control (PDC) system, a total access communication system (TACS), an advanced mobile phone system (AMPS), etc.

5) Acknowledgement (ACK)

ACK is a type of transport-type control character sent by a receiving station to a sending station in data communication and indicates that it is confirmed that sent data is already received without error.

6) Negative Acknowledgement (NACK)

NACK is a type of transport-type control character sent by a receiving station to a sending station in data communication and indicates that sent data is not received, and when the sending station receives NACK, data not sent successfully is re-sent.

7) User Equipment (UE)

In a universal mobile communication system, a terminal is called UE, and in the examples of the present disclosure, the user equipment may be a mobile phone, a smart terminal, a multimedia device, a streaming device, etc.

For example, please refer to FIG. 1, which illustrates a schematic structural diagram of user equipment provided by an example of the present disclosure. As shown in FIG. 1, the user equipment includes a motherboard 110, an external output/input device 120, a memory 130, an external port 140, a touch system 150 and a power source 160.

Processing components such as a processor and a controller are integrated into the motherboard 110.

The external output/input device 120 may include a display component (for example, a display screen), an audio player component (for example, a speaker), an audio collection component (for example, a microphone) and various buttons and the like.

A program code and data are stored in the memory 130.

The external port 140 may include an earphone port, a charging port, a data port and the like.

The touch system 150 may be integrated into the display component or the buttons of the external output/input device 120 and configured to detect a touch operation executed by a user on the display component or the buttons.

The power source 160 is configured to supply power to all other components in the terminal.

In the examples of the present disclosure, the processor in the motherboard 110 may generate an interface content by executing or calling the program code and the data stored in the memory, and the generated interface content is displayed through the external output/input device 120. In a process of displaying the interface content, the touch operation executed by the user during interaction with an interface can be detected through the capacitive touch system 150, and a button pressing operation or other operations executed by the user during interaction with the interface can be detected through the external output/input device 120, for example, a gesture operation, a voice operation, etc.

Figure 2:
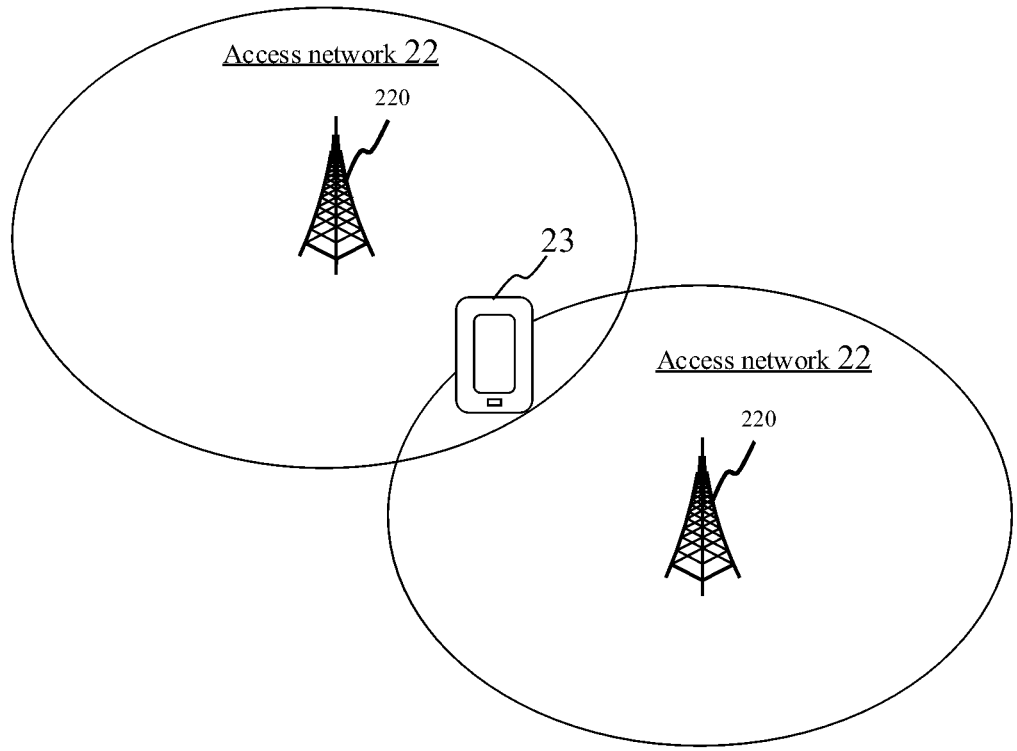
FIG. 2 illustrates a block diagram of a communication system provided by an example of the present disclosure.

FIG. 2 illustrates a block diagram of a communication system provided by an example of the present disclosure. The communication system may include: an access network 22 and a terminal 23.

The access network 22 includes a plurality of access network devices 220. The access network devices 220 may be a base station, and the base station is an apparatus deployed in the access network so as to provide a wireless communication function for the terminal. The base station may include various macro base stations, micro base stations, relay stations, access points, etc. In a system adopting different wireless access technologies, names of devices with a base station function may be different, in the 5th generation (5G) mobile communication, also called new radio (NR) system, it is called an evolved NodeB (eNodeB or eNB). With evolving of a communication technology, "base station" may change. For convenience of the examples of the present disclosure the above apparatus for providing the wireless communication function for the terminal 23 is generally called the access network device.

The terminal 23 may include various hand-held devices, vehicle-mounted devices, wearable devices, computing devices or other processing devices connected to a wireless modem with a wireless communication function, and various user equipment, mobile stations (MSs), terminal devices, etc. For the sake of convenient description, the equipment (or device) mentioned above is generally called the terminal. The access network device 220 and the terminal 23 intercommunicates through a certain air interface technology, for example, a Uu port (a port between user equipment and UMTS terrestrial radio access network).

An international telecommunication union (ITU) divides services in a 5G network into three categories. First category is eMMB (enhanced Mobile Broadband), which is a 5G service type special for serving a mobile device, such as a mobile phone. Second category is URLLC, which is applied to industrial application and an automatic drive vehicle. Third category is mMTC, which is a service type to be applied to a case of "Internet of Things" and "Internet of Everything" and whose strength is to enable a large number of adjacent devices to enjoy smooth communication connection at the same time.

mMTC focuses on solving a problem that a traditional mobile communication cannot support the Internet of Things and a vertical industry application. A low-power large-connection scenario orients to an application case of a smart city, environmental monitoring, smart home, forest fire prevention which uses sensing and data collection as a target, and has the features of small data packet, low power consumption, mass connection, etc.

Figure 3:
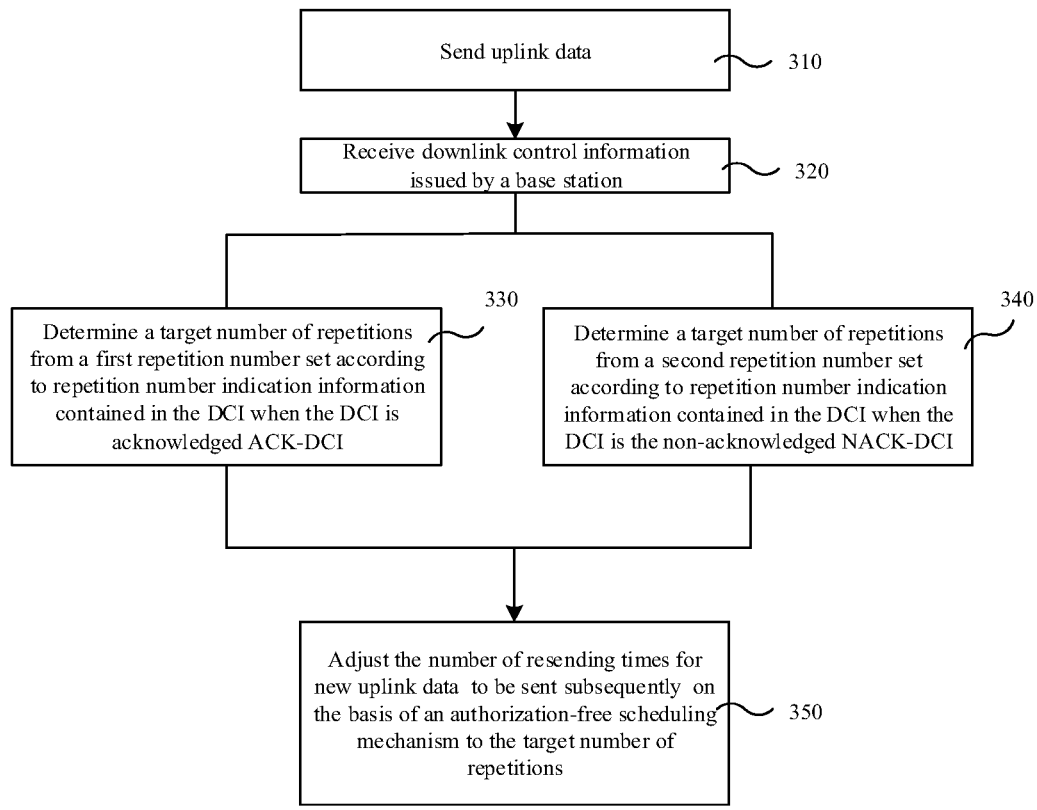
FIG. 3 is a flowchart of a method for adjusting the number of resending times illustrated according to an example.

FIG. 3 is a flowchart of a method for adjusting the number of resending times illustrated according to an example. The method for adjusting the number of resending times is applied to user equipment of authorization-free scheduling, for example, the user equipment may be the user equipment shown in FIG. 1. As shown in FIG. 3, the method for adjusting the number of resending times includes:

In Step 310, uplink data are sent.

Figure 4:
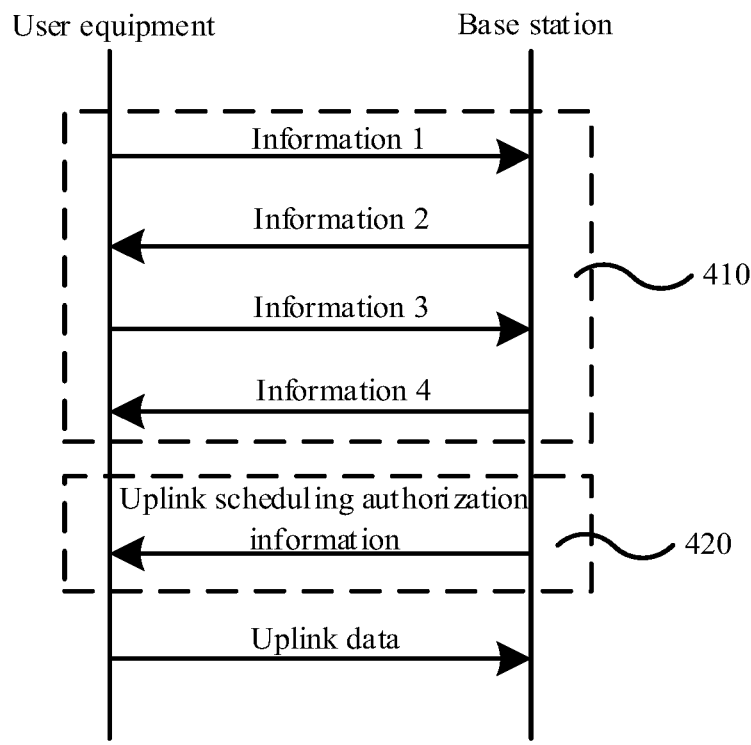
FIG. 4 illustrates a schematic diagram of a traditional data transmission flow provided by an example of the present disclosure.

In the case of the Internet of things, a data volume transmitted every time is small, please refer to FIG. 4, which illustrates a schematic diagram of a traditional data transmission flow provided by an example of the present disclosure. As shown in FIG. 4, transmission of the small data volume according to a traditional LTE data transmission flow needs a random access process 410 and receiving uplink scheduling permission 420, and then data transmission is performed. In the above process, resources occupied by signaling transmission will be far larger than resources occupied by data transmission, which may lead to huge signaling overhead and power waste.

Figure 5:
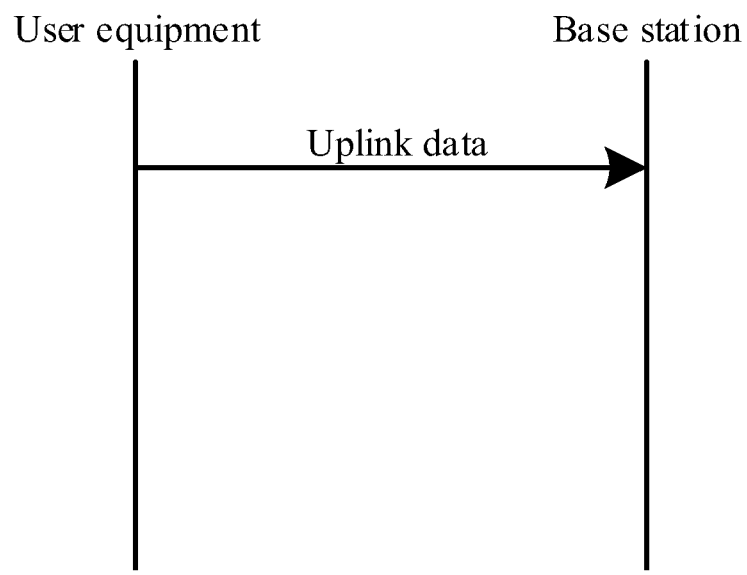
FIG. 5 illustrates a schematic diagram of a data transmission flow of an authorization-free scheduling mechanism provided by an example of the present disclosure.

Thus, as for the case of transmitting the small data volume every time, a 3rd generation partnership project (3GPP) release 16 (R16) proposes introduction of authorization-free uplink scheduling to MTC, NB-IoT. Please refer to FIG. 5, which illustrates a schematic diagram of a data transmission flow of an authorization-free scheduling mechanism provided by an example of the present disclosure. As shown in FIG. 5, a base station pre-configures some scheduling information used for data transmission of the user equipment, for example, resource allocation, a modulation and demodulation mode, etc. When the user equipment needs to perform data transmission, random access and receiving uplink scheduling permission do not need to be performed, uplink transmission can be performed automatically on a resource pre-configured by the base station in a preset mode, and thus the purposes of reducing signaling overhead and avoiding power waste are realized.

Service data of most of IoT user equipment are uploaded periodically, for example, an electricity meter, a water meter and the like performs uploading of service data at interval of a period of time, so the resource configured in the authorization-free uplink scheduling mechanism may be set to occur periodically.

In a possible case, the base station may configure a time-frequency position of a reserved resource, the volume of the resource, a period of occurrence, and meanwhile configure a user data transmission format, for example, a modulation encoding mode. As most of MTC, NB-IoT is deployed in places of large path loss and weak coverage, when the user needs to perform coverage enhancement, the base station may also configure the number of retransmissions.

On the basis of the above pre-configuration of the base station, the user equipment sends the uplink data to the base station through the reserved resource according to the preset number of retransmissions on the basis of the authorization-free scheduling mechanism.

In Step 320, downlink control information (DCI) issued by the base station is received, where the DCI is acknowledged ACK-DCI or non-acknowledged NACK-DCI, the ACK-DCI is used for indicating a transmission success of the uplink data, and the NACK-DCI is used for indicating a transmission failure of the uplink data.

LTE adopts a hybrid automatic repeat request (HARQ) technology to perform interaction between the user equipment and the base station. A specific implementation process of the HARQ is that when a receiving party successfully receives data, the receiving party feeds an ACK back to a sending party, when the sending party receives the ACK fed back by the receiving party, the sending party continues sending next data, when the receiving party does not successfully receive data, the receiving party may feed an NACK back to the sending party, and when the sending party receives the NACK fed back by the receiving party, data which are not successfully sent may be retransmitted.

In the IoT case, the user equipment sends the service data to the base station, when the base station successfully receives the uplink data sent by the user equipment, the base station sends a piece of DCI to the user equipment, the DCI indicates the ACK, which indicates that it is confirmed that the uplink data are received, and the user equipment is indicated to continue sending next data; and when the base station does not successfully receive the uplink data sent by the user equipment, the base station sends a piece of DCI to the user equipment, the DCI indicates the NACK, which indicates that the uplink data are not received, and the user equipment is indicated to resend the data which are not successfully sent.

In Step 330, a target number of repetitions is determined from a first repetition number set according to repetition number indication information contained in the DCI when the DCI is the acknowledged ACK-DCI.

In Step 340, a target number of repetitions is determined from a second repetition number set according to repetition number indication information contained in the DCI when the DCI is the non-acknowledged NACK-DCI.

The user equipment determines the target number of repetitions from the repetition number set corresponding to the ACK-DCI according to the repetition number indication information contained in the DCI when the DCI indicates the ACK, and determines a target number of repetitions from the repetition number set corresponding to the NACK-DCI according to the repetition number indication information contained in the DCI when the DCI indicates the NACK, the repetition number set corresponding to the ACK-DCI is different from the repetition number set corresponding to the NACK-DCI, so the number of repetitions can be flexibly adjusted according to different cases of receiving the ACK-DCI or the NACK-DCI.

As for the IoT case, in a possible case, when the user equipment receives the NACK-DCI, the number of repetitions is small, power accumulation is inadequate, consequently, the uplink data of the user equipment cannot be sent to the base station, the base station cannot obtain the uplink data of the user equipment, in this case, the repetition number indication information contained in the DCI may be indication information used for indicating the user equipment to increase the number of repetitions of sending the uplink data.

In a possible case, when the user equipment receives the ACK-DCI, it indicates that the base station already receives the uplink data of the user equipment, however, in the premise of already presetting the number of repetitions of the uplink data of the user equipment, the user equipment may still perform the process of the uplink data for the preset number of repetitions in the premise of already receiving the ACK-DCI, consequently, a waste of communication resources is caused, and in this case, the repetition number indication information contained in the DCI may be indication information used for indicating the user equipment to reduce the number of repetitions of the uplink data.

In Step 350, the number of resending times for new uplink data to be sent subsequently on the basis of the authorization-free scheduling mechanism is adjusted to the target number of repetitions.

As for the case of receiving the NACK-DCI by the user equipment, when the user equipment resends the data which are not successfully sent, the number of repetitions of sending the data which are not successfully sent is adjusted to the target number of repetitions determined from a repetition number set corresponding to the NACK-DCI according to the repetition number indication information contained in the DCI; and as for the case of receiving the ACK-DCI by the user, when the user equipment sends the next data, the number of repetitions of sending next data is adjusted to the target number of repetitions determined from the repetition number set corresponding to the ACK-DCI according to the repetition number indication information contained in the DCI.

In a possible implementation, the first repetition number set is different from the second repetition number set.

In a possible implementation, before receiving the downlink control information (DCI) issued by the base station, the method further includes:

a first number of repetitions and a second number of repetitions indicated by the base station are obtained;

the first repetition number set is generated according to the first number of repetitions by a set generation rule; and the second repetition number set is generated according to the second number of repetitions by the set generation rule.

In a possible implementation, a repetition number relation is predefined in the user equipment and is a relation between the first number of repetitions and the second number of repetitions; and obtaining the first number of repetitions and the second number of repetitions indicated by the base station includes:

the first number of repetitions indicated by the base station is obtained; and the second number of repetitions is obtained according to the first number of repetitions and the repetition number relation.

In a possible implementation, a repetition number relation is predefined in the user equipment and is a relation between the first number of repetitions and the second number of repetitions; and obtaining the first number of repetitions and the second number of repetitions indicated by the base station includes:

the second number of repetitions indicated by the base station is obtained; and the first number of repetitions is obtained according to the second number of repetitions and the repetition number relation.

In a possible implementation, before receiving the downlink control information (DCI) issued by the base station, the method further includes:

a first basic number of repetitions indicated by the base station is obtained;

the first repetition number set is generated according to the first basic number of repetitions by a first set generation rule;

and/or the second repetition number set is generated according to the first basic number of repetitions by a second set generation rule; where the first set generation rule is different from the second set generation rule.

In a possible implementation, each of the first repetition number set and the second repetition number set contains an initial number of repetitions, and the initial number of repetitions is the number of resending times configured when the base station performs authorization-free scheduling on the user equipment.

In a possible implementation, the first repetition number set and the second repetition number set contain a difference factor, and the difference factor is a difference between the adjusted number of resending times and the second basic number of repetitions;

determining the target number of repetitions from the first repetition number set according to the repetition number indication information contained in the DCI when the DCI is the acknowledged ACK-DCI includes:

a target difference factor is determined from the first repetition number set according to the repetition number indication information contained in the DCI when the DCI is the acknowledged ACK-DCI, and the target number of repetitions is obtained by adding the target difference factor to the second basic number of repetitions; and determining the target number of repetitions from the second repetition number set according to the repetition number indication information contained in the DCI when the DCI is the non-acknowledged NACK-DCI includes:

a target difference factor is determined from the second repetition number set according to the repetition number indication information contained in the DCI when the DCI is the non-acknowledged NACK-DCI, and the target number of repetitions is obtained by adding the target difference factor to the second basic number of repetitions.

In a possible implementation, each of the first repetition number set and the second repetition number set contains a difference factor with a numerical value being 0.

In a possible implementation, the quantity of difference factors larger than 0 in the first repetition number set is smaller than the quantity of difference factors larger than 0 in the second repetition number set.

To sum up, according to the method for adjusting the number of resending times shown by the example of the present disclosure, on the basis of the authorization-free scheduling mechanism, the uplink data are sent through the user equipment, and the DCI issued by the base station is received; the target number of repetitions is determined from the first repetition number set according to the repetition number indication information contained in the DCI when the DCI is the acknowledged ACK-DCI; the target number of repetitions is determined from the second repetition number set according to the repetition number indication information contained in the DCI when the DCI is the non-acknowledged NACK-DCI; and the number of resending times for new uplink data to be sent subsequently is adjusted to the target number of repetitions, so that different numbers of retransmissions may be determined according to different types of DCI, which achieves the reasonable adjustment of the number of repetitions, and improves the flexibility of setting the number of repetitions of the uplink data transmission of the user equipment.

Figure 6:
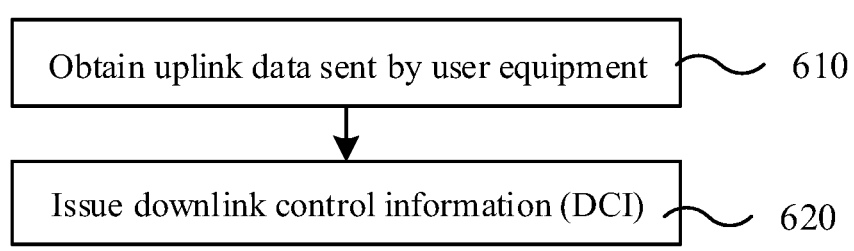
FIG. 6 is a flowchart of a method for adjusting the number of resending times illustrated according to an example.

FIG. 6 is a flowchart of a method for adjusting the number of resending times illustrated according to an example. The method for adjusting the number of resending times is applied to a base station of authorization-free scheduling, for example, the base station may be the access network device shown in FIG. 2. As shown in FIG. 6, the method for adjusting the number of resending times includes:

Step 610, uplink data sent by user equipment are obtained.

Step 620, downlink control information (DCI) is issued, where the DCI is acknowledged ACK-DCI or non-acknowledged NACK-DCI, the ACK-DCI is used for indicating a transmission success of the uplink data, and the NACK-DCI is used for indicating a transmission failure of the uplink data; and the DCI is used for indicating the user equipment to determine a target number of repetitions from a first repetition number set according to repetition number indication information contained in the DCI when the DCI is the acknowledged ACK-DCI, and determine a target number of repetitions from a second repetition number set according to repetition number indication information contained in the DCI when the DCI is the non-acknowledged NACK-DCI.

In a possible implementation, the first repetition number set is different from the second repetition number set.

In a possible implementation, before issuing the downlink control information (DCI), the method further includes:

a first number of repetitions and a second number of repetitions are indicated to the user equipment, so as to enable the user equipment to generate the first repetition number set according to the first number of repetitions by the set generation rule, and/or generate the second repetition number set according to the second number of repetitions by the set generation rule.

In a possible implementation, a repetition number relation is predefined in the user equipment and is a relation between the first number of repetitions and the second number of repetitions; and indicating the first number of repetitions and the second number of repetitions to the user equipment includes:

the first number of repetitions is indicated to the user equipment, so as to enable the user equipment to obtain the second number of repetitions according to the first number of repetitions and the repetition number relation.

In a possible implementation, a repetition number relation is predefined in the user equipment and is a relation between the first number of repetitions and the second number of repetitions; and indicating the first number of repetitions and the second number of repetitions to the user equipment includes:

the second number of repetitions is indicated to the user equipment, so as to enable the user equipment to obtain the first number of repetitions according to the second number of repetitions and the repetition number relation.

In a possible implementation, before issuing the downlink control information (DCI), the method further includes:

the first basic number of repetitions is indicated to the user equipment, so as to enable the user equipment to generate the first repetition number set according to the first basic number of repetitions by a first set generation rule, and/or generate the second repetition number set according to the first basic number of repetitions by a second set generation rule.

the first set generation rule is different from the second set generation rule.

In a possible implementation, each of the first repetition number set and the second repetition number set contains an initial number of repetitions, and the initial number of repetitions is the number of resending times configured when the base station performs authorization-free scheduling on the user equipment.

To sum up, according to the method for adjusting the number of resending times illustrated by the example of the present disclosure, the uplink data sent by the user equipment on the basis of the authorization-free scheduling mechanism are obtained through the base station, the DCI containing the repetition number indication information is issued, so that according to the DCI containing the repetition number indication information, the user equipment determines the target number of repetitions from the first repetition number set according to the repetition number indication information contained in the DCI when the DCI is the acknowledged ACK-DCI, and determines the target number of repetitions from the second repetition number set according to the repetition number indication information contained in the DCI when the DCI is the non-acknowledged NACK-DCI; and the number of resending times for new uplink data to be sent subsequently is adjusted to the target number of repetitions, so that different numbers of retransmissions may be determined according to different types of DCI, which achieves the reasonable adjustment of the number of repetitions, and improves the flexibility of setting the number of repetitions of the uplink data transmission of the user equipment.

Figure 7:
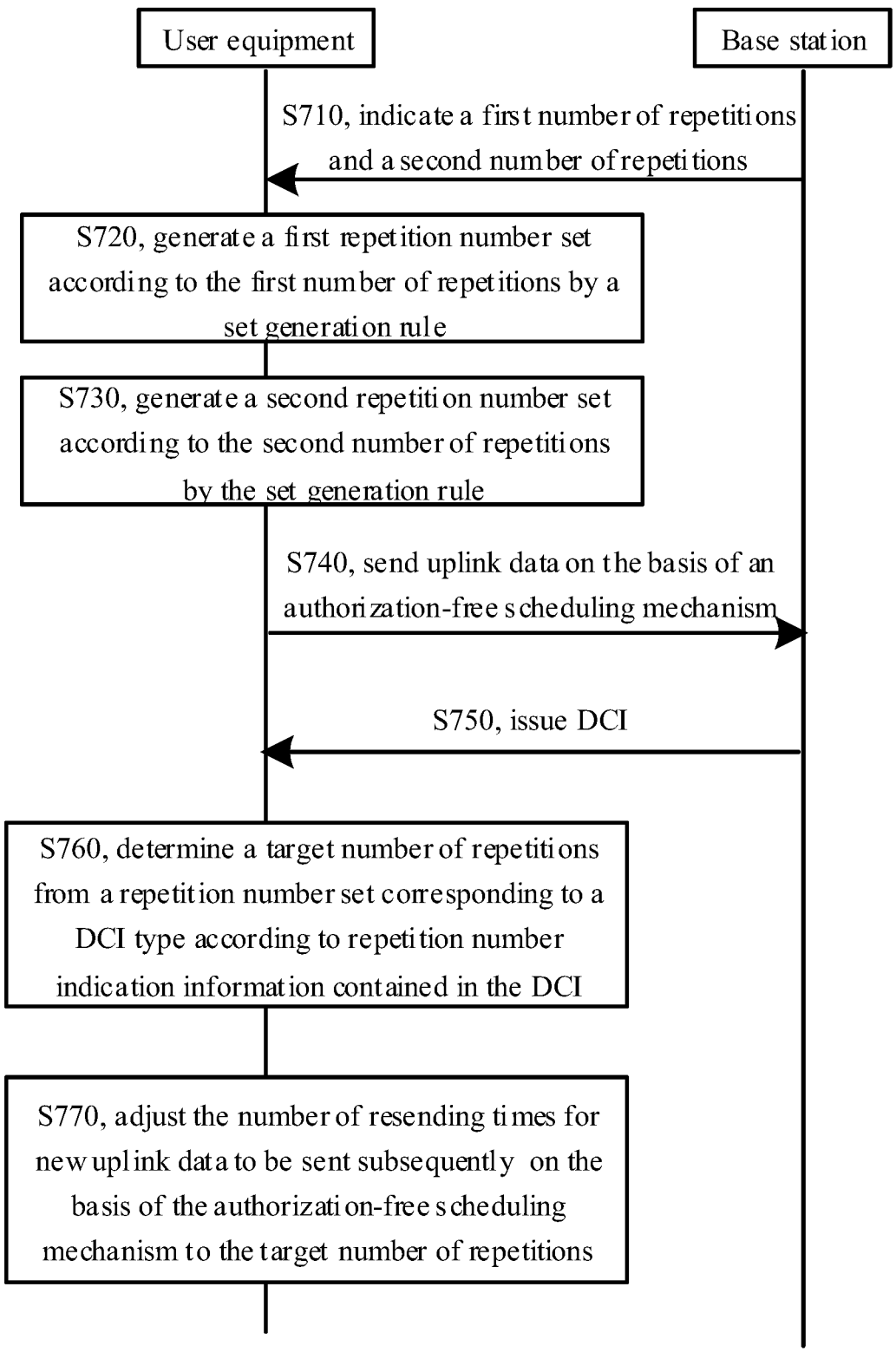
FIG. 7 is a flowchart of a method for adjusting the number of resending times illustrated according to an example.

FIG. 7 is a flowchart of a method for adjusting the number of resending times illustrated according to an example. The method for adjusting the number of resending times is executed by interaction of the user equipment and the base station, for example, the user equipment and the base station may be the terminal and the access network device show in FIG. 2. As shown in FIG. 7, the method for adjusting the number of resending times includes:

Step 710, the base station indicates a first number of repetitions and a second number of repetitions to the user equipment, correspondingly, the user equipment obtains the first number of repetitions and the second number of repetitions indicated by the base station.

The base station may directly configure the first number of repetitions and the second number of repetitions for the user equipment through high-layer signaling, or the base station may configure only the first number of repetitions through the high-layer signaling, or the base station may configure only the second number of repetitions through the high-layer signaling. In a possible implementation, the high-layer signaling may be radio resource control (RRC) signaling.

Step 720, the user equipment generates a first repetition number set according to the first number of repetitions by a set generation rule.

Step 730, the user equipment generates a second repetition number set according to the second number of repetitions by the set generation rule.

For example, when the high-layer signaling directly configures the first number of repetitions and the second number of repetitions, the user equipment may directly obtain the first number of repetitions $R_{max0}$ and the second number of repetitions $R_{max1}$, the user equipment generates the first repetition number set and the second repetition number set corresponding to the first number of repetitions $R_{max0}$ and the second number of repetitions $R_{max1}$ respectively according to a preset set generation rule.

For example, in a possible case, hypothetically, a computing formula of the set generation rule is:

$$J=\{1, 1/2, 1/4, 1/8\} \times R_{max}$$

J is the repetition number set, and $R_{max}$ is the number of repetitions configured by the high-layer signaling.

Through the above formula, the first repetition number set $J_1$ can be obtained according to the first number of repetitions $R_{max0}$ to be $\{R_{max0}, 1/2 R_{max0}, 1/4 R_{max0}, 1/8 R_{max0}\}$, and the second repetition number set $J_2$ can be obtained according to the second number of repetitions $R_{max1}$ to be $\{R_{max1}, 1/2 R_{max1}, 1/4 R_{max1}, 1/8 R_{max1}\}$.

In a possible case, each of the first repetition number set and the second repetition number set contains the number of resending times $R_0$ configured for the user equipment during authorization-free scheduling. For example, in the first repetition number set $J_1$, $1/2 R_{max0} = R_0$, in the second repetition number set $J_2$, $1/4 R_{max1} = R_0$.

In a possible implementation, a numerical value of the first number of repetitions is smaller than a numerical value of the second number of repetitions.

When the repetition number relation is predefined in the user equipment, that is, a relative relation between the first number of repetitions and the second number of repetitions is preset in the user equipment, the high-layer signaling may configure one of the first number of repetitions or the second number of repetitions.

When the high-layer signaling configures only the first number of repetitions, the user equipment obtains the first number of repetitions indicated by the high-layer signaling; and the second number of repetitions is obtained according to the first number of repetitions and the repetition number relation.

When the high-layer signaling configures only the second number of repetitions, the user equipment obtains the second number of repetitions indicated by the high-layer signaling; and the first number of repetitions is obtained according to the second number of repetitions and the repetition number relation.

For example, the relative relation between the first number of repetitions and the second number of repetitions preset in the user equipment is:

$$R_{max0} = \tfrac{1}{2} R_{max1}$$

$R_{max0}$ is the first number of repetitions, and $R_{max1}$ is the second number of repetitions.

When the high-layer signaling configures only the first number of repetitions $R_{max0}$, the second number of repetitions $R_{max1}$ can be solved to be $2R_{max0}$ according to the above formula, and when the high-layer signaling configures only the second number of repetitions $R_{max1}$, the first number of repetitions $R_{max0}$ can be solved to be $\tfrac{1}{2} R_{max1}$ according to the above relation.

According to the set generation rule:

$$J = \{1, \tfrac{1}{2}, \tfrac{1}{4}, \tfrac{1}{8}\} \times R_{max}$$

The first repetition number set $J_1$ can be obtained, which is $\{R_{max0}, \tfrac{1}{2}R_{max0}, \tfrac{1}{4}R_{max0}, \tfrac{1}{8}R_{max0}\}$, and the second repetition number set $J_2$ can be obtained, which is $\{2R_{max0}, R_{max0}, \tfrac{1}{2}R_{max0}, \tfrac{1}{4}R_{max0}\}$.

It needs to be noted that a numerical value relation between the first repetition number set and the second repetition number set and description of the set generation rule are both examples, the present disclosure does not limit the numerical value relation between the first repetition number set and the second repetition number set and the set generation rule.

Step 740, the user equipment sends the uplink data on the basis of the authorization-free scheduling mechanism, correspondingly, the base station receives the uplink data.

Step 750, the base station issues the DCI, where the DCI is acknowledged ACK-DCI or non-acknowledged NACK-DCI, the ACK-DCI is used for indicating a transmission success of the uplink data, and the NACK-DCI is used for indicating a transmission failure of the uplink data, correspondingly, the user equipment receives the DCI.

Step 760, the user equipment determines a target number of repetitions from a repetition number set corresponding to a DCI type according to repetition number indication information contained in the DCI; where a first repetition number set corresponding to the ACK-DCI is different from a second repetition number set corresponding to the NACK-DCI.

The first repetition number set corresponding to the ACK-DCI is the above first repetition number set generated by the user equipment with reference to the first number of repetitions according to the set generation rule, and the second repetition number set corresponding to the NACK-DCI is the second repetition number set generated by the user equipment with reference to the second number of repetitions according to the set generation rule.

Step 770, the user equipment adjusts the number of resending times for new uplink data to be sent subsequently on the basis of the authorization-free scheduling mechanism to the target number of repetitions.

To sum up, according to the method for adjusting the number of resending times illustrated by the example of the present disclosure, on the basis of the authorization-free scheduling mechanism, the uplink data are sent through the user equipment, the DCI issued by the base station is received, the target number of repetitions is determined from the first repetition number set according to the repetition number indication information contained in the DCI when the DCI is the acknowledged ACK-DCI; the target number of repetitions is determined from the second repetition number set according to the repetition number indication information contained in the DCI when the DCI is the non-acknowledged NACK-DCI; and the number of resending times for new uplink data to be sent subsequently is adjusted to the target number of repetitions, so that different numbers of retransmissions may be determined according to different types of DCI, which achieves the reasonable adjustment of the number of repetitions, and improves the flexibility of setting the number of repetitions of the uplink data transmission of the user equipment.

Figure 8:
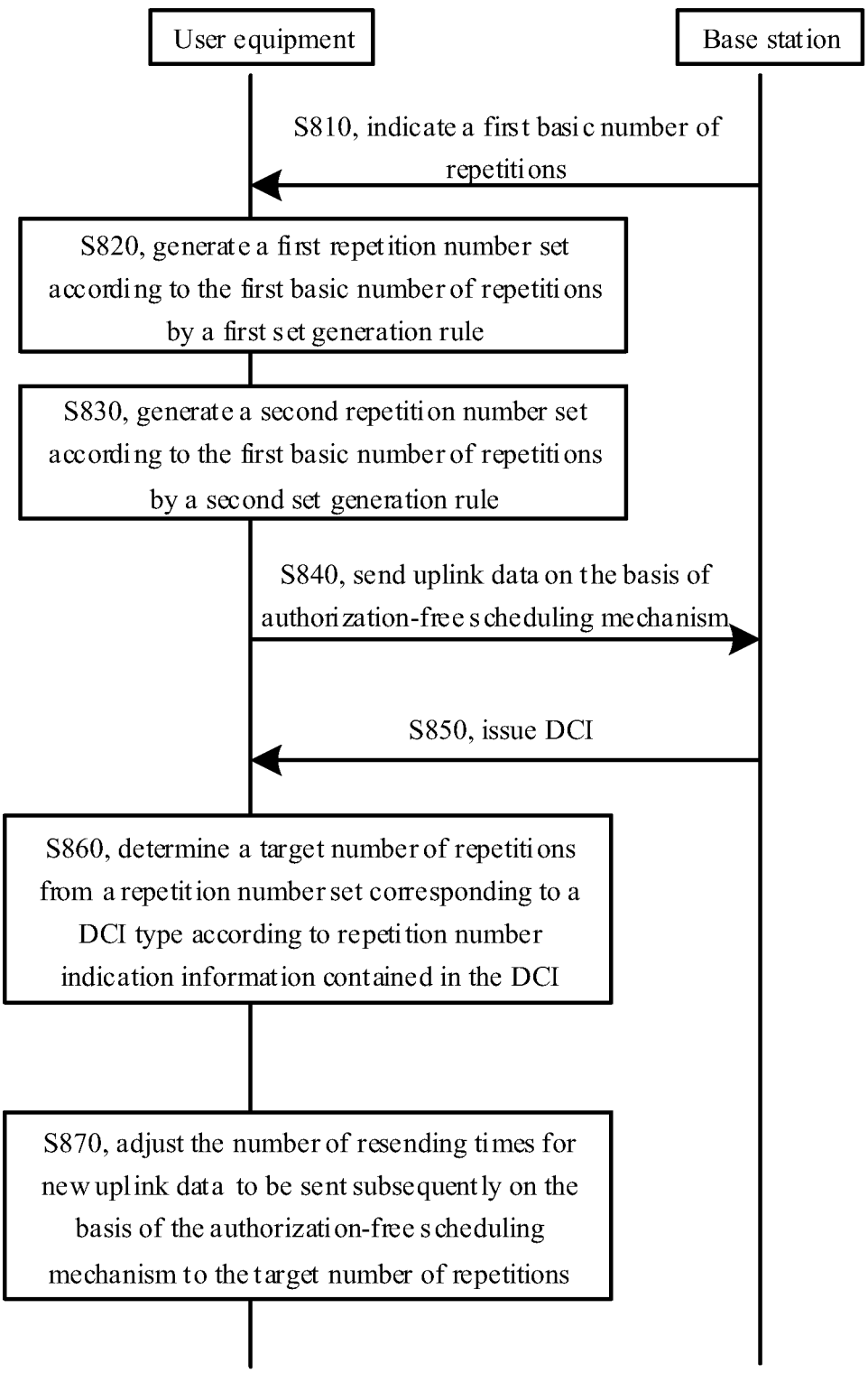
FIG. 8 is a flowchart of a method for adjusting the number of resending times illustrated according to an example.

On the basis of the above example shown in FIG. 7, please refer to FIG. 8, which is a flowchart of a method for adjusting the number of resending times illustrated according to an example. The method for adjusting the number of resending times is executed by interaction of the user equipment and the base station, for example, the user equipment and the base station may be the terminal and the access network device shown in FIG. 2. As shown in FIG. 8, the method for adjusting the number of resending times includes:

Step 810, the base station indicates a first basic number of repetitions to the user equipment, correspondingly, the user equipment obtains the first basic number of repetitions.

In a possible implementation, the first basic number of repetitions may be the number of resending times configured when the base station performs authorization-free scheduling on the user equipment.

Step 820, the user equipment generates the first repetition number set according to the first basic number of repetitions by a first set generation rule.

Step 830, the user equipment generates the second repetition number set according to the first basic number of repetitions by a second set generation rule.

The first set generation rule is different from the second set generation rule.

When the repetition number set generation rule based on the first basic number of repetitions is predefined in the user equipment, the base station issues high-layer signaling indicating the first basic number of repetitions, when the user equipment obtains the first basic number of repetitions, the first repetition number set and the second repetition number set are generated according to the predefined first set generation rule and second set generation rule.

For example, in a possible case, the predefined first set generation rule and second set generation rule in the user equipment are:

$$J_1 = \{2, 1, \tfrac{1}{2}, \tfrac{1}{4}\} \times R_0$$

$$J_2 = \{4, 2, 1, \tfrac{1}{2}\} \times R_0$$

$J_1$ is the first repetition number set, $J_2$ is the second repetition number set, and $R_0$ is the first basic number of repetitions.

On the basis of the above first set generation rule and second set generation rule, it can be obtained that the first repetition number set $J_1$ is $\{2R_0, R_0, \tfrac{1}{2}R_0, \tfrac{1}{4}R_0\}$, and the second repetition number set $J_2$ is $\{4R_0, 2R_0, R_0, \tfrac{1}{2}R_0\}$.

In a possible implementation, each of the first repetition number set and the second repetition number set generated according to the first set generation rule and the second set generation rule contains the first basic number of repetitions.

For example, each of the above first repetition number set $J_1$ and the second repetition number set $J_2$ contains the first basic number of repetitions $R_0$.

Step 840, the user equipment sends the uplink data on the basis of the authorization-free scheduling mechanism, correspondingly, the base station receives the uplink data.

Step 850, the base station issues the DCI, where the DCI is acknowledged ACK-DCI or non-acknowledged NACK-DCI, the ACK-DCI is used for indicating a transmission success of the uplink data, and the NACK-DCI is used for indicating a transmission failure of the uplink data, correspondingly, the user equipment receives the DCI.

Step 860, the user equipment determines the target number of repetitions from the repetition number set corresponding to the DCI type according to the repetition number indication information contained in the DCI, and the first repetition number set corresponding to the ACK-DCI is different from the second repetition number set corresponding to the NACK-DCI.

Step 870, the user equipment adjusts the number of resending times for new uplink data to be sent subsequently on the basis of the authorization-free scheduling mechanism to the target number of repetitions.

Implementations of step 810, step 850 to step 870 may refer to related contents in the example shown in FIG. 3 or FIG. 7, which is not described in detail here.

To sum up, according to the method for adjusting the number of resending times shown in the example of the present disclosure, on the basis of the authorization-free scheduling mechanism, the uplink data are sent through the user equipment, the DCI issued by the base station is received, the target number of repetitions is determined from the first repetition number set according to the repetition number indication information contained in the DCI when the DCI is the acknowledged ACK-DCI; the target number of repetitions is determined from the second repetition number set according to the repetition number indication information contained in the DCI when the DCI is the non-acknowledged NACK-DCI; and the number of resending times for new uplink data to be sent subsequently is adjusted to the target number of repetitions, so that different numbers of retransmissions may be determined according to different types of DCI, which achieves the reasonable adjustment of the number of repetitions, and improves the flexibility of setting the number of repetitions of the uplink data transmission of the user equipment.

In the above example, each repetition number set contains a plurality of numbers of repetitions. Optionally, in another possible implementation, each of the above repetition number set may also contains a difference factor, and the difference factor may be used for obtaining the number of repetitions to reach after being adjusted in combination with the second basic number of repetitions.

Figure 9:
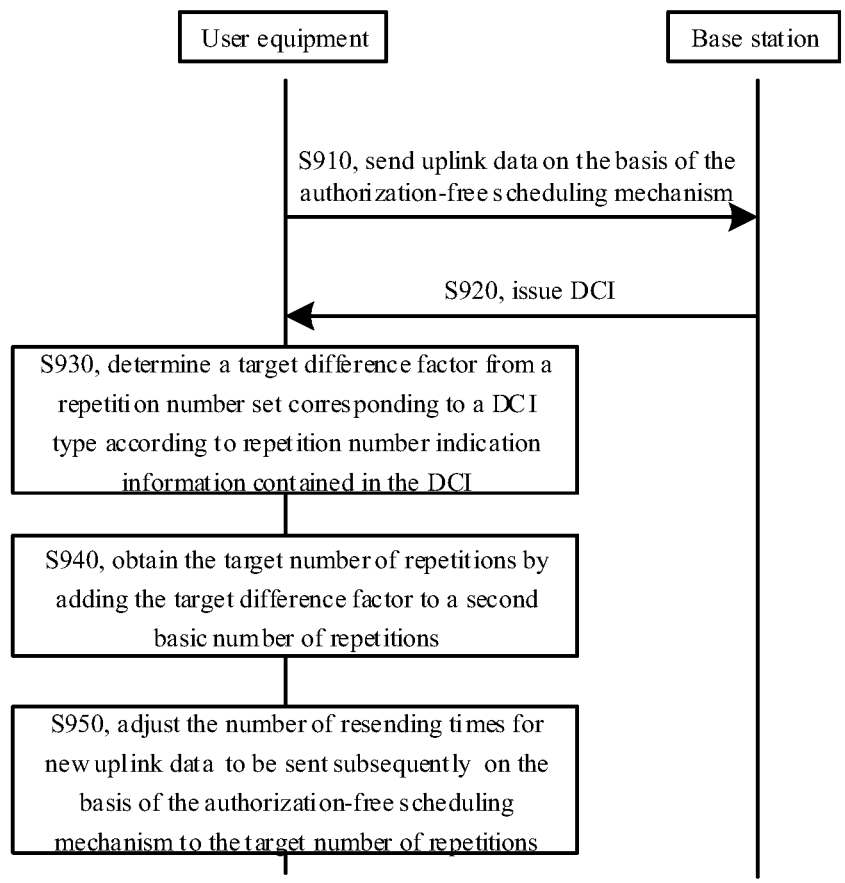
FIG. 9 is a flowchart of a method for adjusting the number of resending times illustrated according to an example.

For example, when the first repetition number set and the second repetition number set contain the difference factor, the difference factor may be a difference between the adjusted number of resending times and the second basic number of repetitions. Please refer to FIG. 9, which is a flowchart of a method for adjusting the number of resending times illustrated according to an example. The method for adjusting the number of resending times is executed by interaction of the user equipment and the base station, for example, the user equipment and the base station may be the terminal and the access network device shown in FIG. 2. As shown in FIG. 9, the method for adjusting the number of resending times includes:

Step 910, the user equipment sends the uplink data on the basis of the authorization-free scheduling mechanism, correspondingly, the base station receives the uplink data.

Step 920, the base station issues the DCI, where the DCI is acknowledged ACK-DCI or non-acknowledged NACK-DCI, the ACK-DCI is used for indicating a transmission success of the uplink data, and the NACK-DCI is used for indicating a transmission failure of the uplink data, correspondingly, the user equipment receives the DCI.

Step 930, the user equipment determines a target difference factor from a repetition number set corresponding to a DCI type according to repetition number indication information contained in the DCI, and the first repetition number set corresponding to the ACK-DCI is different from the second repetition number set corresponding to the NACK-DCI.

Step 940, the user equipment adds the target difference factor to the second basic number of repetitions to obtain the target number of repetitions.

Difference factors contained in the repetition number set are difference factor sets corresponding to the ACK-DCI and the NACK-DCI respectively predefined by the base station for the user equipment, that is, the first repetition number set corresponding to the ACK-DCI is a first difference factor set, the second repetition number set corresponding to the NACK-DCI is a second difference factor set, in a process of adjusting the number of resending times, the DCI issued by the base station indicates a certain difference in the difference factor set to be the target difference factor, and the user equipment adds the target difference factor to the second basic number of repetitions so as to obtain the target number of repetitions.

In a possible implementation, the second basic number of repetitions may be the number of resending times configured when the base station performs authorization-free scheduling on the user equipment.

For example, in a possible case, the difference factor sets corresponding to the ACK-DCI and the NACK-DCI respectively in the user equipment predefined by the base station are the first difference factor set $\{A, B, C, D\}$ and the second difference factor set $\{E, F, G, H\}$, when the DCI type is the ACK-DCI, the repetition number indication information contained in DCI indicates the difference factor to be third difference factor, the user equipment can obtain the adjusted number of sending times according to the first difference factor set $\{A, B, C, D\}$ corresponding to the ACK-DCI and the second basic number of repetitions $R_0$, which is $R_0+C$, when DCI type is the NACK-DCI, the repetition number indication information contained in DCI indicates the difference factor to be the third difference factor, the user equipment can obtain the adjusted number of sending times according to the second difference factor set $\{E, F, G, H\}$ corresponding to the NACK-DCI and the second basic number of repetitions $R_0$, which is $R_0+G$.

In a possible implementation, each of the first difference factor set and the second difference factor set contains a difference factor with a numerical value being 0, so that the number-of-sending-times sets of the ACK-DCI and the NACK-DCI adjusted respectively each contain the second basic number of repetitions.

In a possible implementation, the quantity of difference factors larger than 0 in the first repetition number set is smaller than the quantity of difference factors larger than 0 in the second repetition number set.

Step 950, the user equipment adjusts the number of resending times for new uplink data to be sent subsequently on the basis of the authorization-free scheduling mechanism to the target number of repetitions.

Implementation processes of step 910, step 920 and step 950 may refer to related contents in the example shown in FIG. 3, which is not described in detail here.

To sum up, according to the method for adjusting the number of resending times shown by the example of the present disclosure, on the basis of the authorization-free scheduling mechanism, the uplink data are sent through the user equipment, and the DCI issued by the base station is received; the target number of repetitions is determined from the first repetition number set according to the repetition number indication information contained in the DCI when the DCI is the acknowledged ACK-DCI; the target number of repetitions is determined from the second repetition number set according to the repetition number indication information contained in the DCI when the DCI is the non-acknowledged NACK-DCI; and the number of resending times for new uplink data to be sent subsequently is adjusted to the target number of repetitions, so that different numbers of retransmissions may be determined according to different types of DCI, which achieves the reasonable adjustment of the number of repetitions, and improves the flexibility of setting the number of repetitions of the uplink data transmission of the user equipment.

Figure 10:
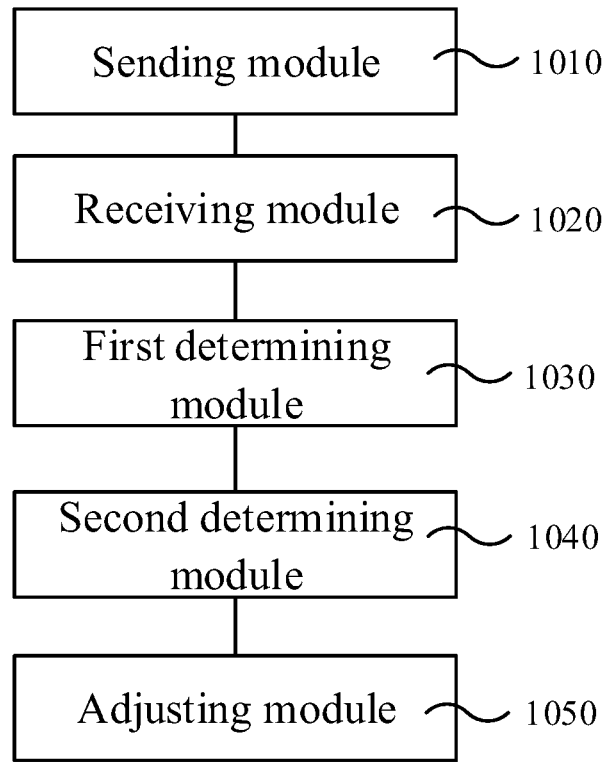
FIG. 10 is a block diagram of an apparatus for adjusting the number of resending times illustrated according to an example.

FIG. 10 is a block diagram of an apparatus for adjusting the number of resending times illustrated according to an example. The apparatus for adjusting the number of resending times is applied to user equipment to execute all or a part of steps of the method shown in any example in FIG. 3, FIG. 7, FIG. 8 or FIG. 9. The user equipment may be the user equipment shown in FIG. 1. As shown in FIG. 10, the apparatus for adjusting the number of resending times may include:

- a sending module 1010, configured to send uplink data on the basis of an authorization-free scheduling mechanism;
- a receiving module 1020, configured to receive downlink control information (DCI) issued by a base station, where the DCI is acknowledged ACK-DCI or non-acknowledged NACK-DCI, the ACK-DCI is used for indicating a transmission success of the uplink data, and the NACK-DCI is used for indicating a transmission failure of the uplink data;
- a first determining module 1030, configured to determine a target number of repetitions from a first repetition number set according to repetition number indication information contained in the DCI when the DCI is the acknowledged ACK-DCI;
- a second determining module 1040, configured to determine a target number of repetitions from a second repetition number set according to repetition number indication information contained in the DCI when the DCI is the non-acknowledged NACK-DCI; and
- an adjusting module 1050, configured to adjust the number of resending times for new uplink data to be sent subsequently on the basis of the authorization-free scheduling mechanism to the target number of repetitions.

In a possible implementation, the first repetition number set is different from the second repetition number set.

In a possible implementation, the apparatus further includes:

- a first obtaining module, configured to obtain a first number of repetitions and a second number of repetitions indicated by the base station before the receiving module 1020 receives the downlink control information (DCI) issued by the base station;
- a first generation module, configured to generate the first repetition number set according to the first number of repetitions by a set generation rule; and
- a second generation module, configured to generate the second repetition number set according to the second number of repetitions by the set generation rule.

In a possible implementation, a repetition number relation is predefined in the user equipment and is a relation between the first number of repetitions and the second number of repetitions; and the first obtaining module includes:
- a first obtaining sub-module, configured to obtain the first number of repetitions indicated by the base station; and
- a second obtaining sub-module, configured to obtain the second number of repetitions according to the first number of repetitions and the repetition number relation.

In a possible implementation, the first obtaining module includes:
- a third obtaining sub-module, configured to obtain the second number of repetitions indicated by the base station; and
- a fourth obtaining sub-module, configured to obtain the first number of repetitions according to the second number of repetitions and the repetition number relation.

In a possible implementation, the apparatus further includes:

- a second obtaining module, configured to obtain a first basic number of repetitions indicated by the base station;
- a third generation module, configured to generate the first repetition number set according to the first basic number of repetitions by a first set generation rule; and
- a fourth generation module, configured to generate the second repetition number set according to the first basic number of repetitions by a second set generation rule; where the first set generation rule is different from the second set generation rule.

In a possible implementation, each of the first repetition number set and the second repetition number set contains an initial number of repetitions, and the initial number of repetitions is the number of resending times configured when the base station performs authorization-free scheduling on the user equipment.

In a possible implementation, the first repetition number set and the second repetition number set contain a difference factor, and the difference factor is a difference between the adjusted number of resending times and the second basic number of repetitions;

the first determining module 1030 is configured to determine a target difference factor from the first repetition number set according to the repetition number indication information contained in the DCI when the DCI is the acknowledged ACK-DCI, and obtain the target number of repetitions by adding the target difference factor to the second basic number of repetitions; and the second determining module 1040 is configured to determine a target difference factor from the second repetition number set according to the repetition number indication information contained in the DCI when the DCI is the non-acknowledged NACK-DCI, and obtain the target number of repetitions by adding the target difference factor to the second basic number of repetitions.

In a possible implementation, each of the first repetition number set and the second repetition number set contains a difference factor with a numerical value being 0.

In a possible implementation, the quantity of difference factors larger than 0 in the first repetition number set is smaller than the quantity of difference factors larger than 0 in the second repetition number set.

To sum up, the apparatus for adjusting the number of resending times illustrated by the example of the present disclosure is applied to the user equipment, on the basis of the authorization-free scheduling mechanism, the uplink data are sent through the user equipment, and the DCI issued by the base station is received; the target number of repetitions is determined from the first repetition number set according to the repetition number indication information contained in the DCI when the DCI is the acknowledged ACK-DCI; the target number of repetitions is determined from the second repetition number set according to the repetition number indication information contained in the DCI when the DCI is the non-acknowledged NACK-DCI; and the number of resending times for new uplink data to be sent subsequently is adjusted to the target number of repetitions, so that different numbers of retransmissions may be determined according to different types of DCI, which achieves the reasonable adjustment of the number of repetitions, and improves the flexibility of setting the number of repetitions of the uplink data transmission of the user equipment.

Figure 11:
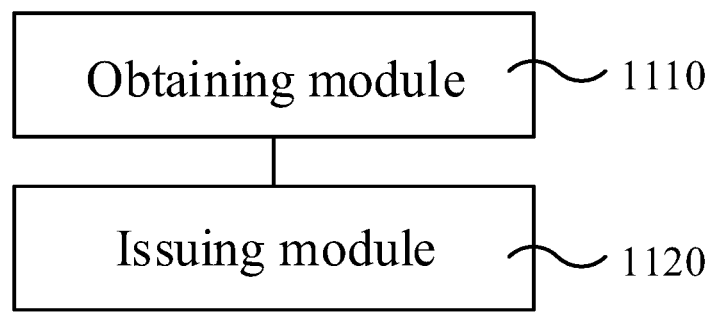
FIG. 11 is a block diagram of an apparatus for adjusting the number of resending times illustrated according to an example.

FIG. 11 is a block diagram of an apparatus for adjusting the number of resending times illustrated according to an example. The apparatus for adjusting the number of resending times is applied to a base station of authorization-free scheduling to execute all or a part of steps of the method shown in any example in FIG. 6, FIG. 7 or FIG. 8. The user equipment may be the access network equipment shown in FIG. 2. As shown in FIG. 11, the apparatus for adjusting the number of resending times may include:

an obtaining module 1110, configured to obtain uplink data sent by user equipment on the basis of the authorization-free scheduling mechanism; and an issuing module 1120, configured to issue downlink control information (DCI), where the DCI is acknowledged ACK-DCI or non-acknowledged NACK-DCI, the ACK-DCI is used for indicating a transmission success of the uplink data, and the NACK-DCI is used for indicating a transmission failure of the uplink data; and the DCI is used for indicating the user equipment to determine a target number of repetitions from a first repetition number set according to repetition number indication information contained in the DCI when the DCI is the acknowledged ACK-DCI, and determine a target number of repetitions from a second repetition number set according to repetition number indication information contained in the DCI when the DCI is the non-acknowledged NACK-DCI.

In a possible implementation, the first repetition number set is different from the second repetition number set.

In a possible implementation, the apparatus further includes:

a first indication module, configured to indicate a first number of repetitions and a second number of repetitions to the user equipment before the issuing module issues the downlink control information (DCI), so as to enable the user equipment to generate the first repetition number set according to the first number of repetitions by the set generation rule, and/or generate the second repetition number set according to the second number of repetitions by the set generation rule.

In a possible implementation, a repetition number relation is predefined in the user equipment and is a relation between the first number of repetitions and the second number of repetitions; and the first indication module includes:

a first indication sub-module, configured to indicate the first number of repetitions to the user equipment, so as to enable the user equipment to obtain the second number of repetitions according to the first number of repetitions and the repetition number relation.

In a possible implementation, a repetition number relation is predefined in the user equipment and is a relation between the first number of repetitions and the second number of repetitions;

the first indication module includes:

a second indication sub-module, configured to indicate the second number of repetitions to the user equipment, so as to enable the user equipment to obtain the first number of repetitions according to the second number of repetitions and the repetition number relation.

In a possible implementation, the apparatus further includes:

a second indication module, configured to indicate the first basic number of repetitions to the user equipment, so as to enable the user equipment to generate the first repetition number set according to the first basic number of repetitions by a first set generation rule, and/or generate the second repetition number set according to the first basic number of repetitions by a second set generation rule; where the first set generation rule is different from the second set generation rule.

In a possible implementation, each of the first repetition number set and the second repetition number set contains an initial number of repetitions, and the initial number of repetitions is the number of resending times configured when the base station performs authorization-free scheduling on the user equipment.

To sum up, the apparatus for adjusting the number of resending times illustrated by the example of the present disclosure is applied to the base station, the uplink data sent by the user equipment on the basis of the authorization-free scheduling mechanism are obtained through the base station, the DCI containing the repetition number indication information is issued, so that according to the DCI containing the repetition number indication information, the user equipment determines the target number of repetitions from the first repetition number set according to the repetition number indication information contained in the DCI when the DCI is the acknowledged ACK-DCI, and determines the target number of repetitions from the second repetition number set according to the repetition number indication information contained in the DCI when the DCI is the non-acknowledged NACK-DCI; and the number of resending times for new uplink data to be sent subsequently is adjusted to the target number of repetitions, so that different numbers of retransmissions may be determined according to different types of DCI, which achieves the reasonable adjustment of the number of repetitions, and improves the flexibility of setting the number of repetitions of the uplink data transmission of the user equipment.

An example of the present disclosure provides an apparatus for adjusting the number of resending times, and the apparatus is applied to the user equipment, and can implement all or a part of steps of the method shown in any example of the present disclosure in FIG. 3, FIG. 7, FIG. 8 or FIG. 9. The user equipment may be the user equipment shown in FIG. 1. The apparatus for adjusting the number of resending times includes: a processor, and a memory configured to store an instruction executable by the processor.

The processor is configured to:
send uplink data on the basis of an authorization-free scheduling mechanism;
receive downlink control information DCI issued by a base station, where the DCI is acknowledged ACK-DCI or non-acknowledged NACK-DCI, the ACK-DCI is used for indicating a transmission success of the uplink data, and the NACK-DCI is used for indicating a transmission failure of the uplink data;
determine a target number of repetitions from a first repetition number set according to repetition number indication information contained in the DCI when the DCI is the acknowledged ACK-DCI;
determine a target number of repetitions from a second repetition number set according to repetition number indication information contained in the DCI when the DCI is the non-acknowledged NACK-DCI; and adjust the number of resending times for new uplink data to be sent subsequently on the basis of the authorization-free scheduling mechanism to the target number of repetitions.

In a possible implementation, the first repetition number set is different from the second repetition number set.

In a possible implementation, the processor is further configured to:
obtain a first number of repetitions and a second number of repetitions indicated by the base station before receiving the downlink control information (DCI) issued by the base station;
generate the first repetition number set according to the first number of repetitions by a set generation rule; and
generate the second repetition number set according to the second number of repetitions by the set generation rule.

In a possible implementation, a repetition number relation is predefined in the user equipment and is a relation between the first number of repetitions and the second number of repetitions; and
obtaining the first number of repetitions and the second number of repetitions indicated by the base station includes:
obtaining the first number of repetitions indicated by the base station; and
obtaining the second number of repetitions according to the first number of repetitions and the repetition number relation.

In a possible implementation, a repetition number relation is predefined in the user equipment and is a relation between the first number of repetitions and the second number of repetitions; and
obtaining the first number of repetitions and the second number of repetitions indicated by the base station includes:
obtaining the second number of repetitions indicated by the base station; and
obtaining the first number of repetitions according to the second number of repetitions and the repetition number relation.

In a possible implementation, the processor is further configured to:
obtain a first basic number of repetitions indicated by the base station before receiving the downlink control information (DCI) issued by the base station;
generate the first repetition number set according to the first basic number of repetitions by a first set generation rule;
and/or
generate the second repetition number set according to the first basic number of repetitions by a second set generation rule; where
the first set generation rule is different from the second set generation rule.

In a possible implementation, each of the first repetition number set and the second repetition number set contains an initial number of repetitions, and the initial number of repetitions is the number of resending times configured when the base station performs authorization-free scheduling on the user equipment.

In a possible implementation, the first repetition number set and the second repetition number set contain a difference factor, and the difference factor is a difference between the adjusted number of resending times and the second basic number of repetitions;
determining the target number of repetitions from the first repetition number set according to the repetition number indication information contained in the DCI when the DCI is the acknowledged ACK-DCI includes:
determining a target difference factor from the first repetition number set according to the repetition number indication information contained in the DCI when the DCI is the acknowledged ACK-DCI, and obtaining the target number of repetitions by adding the target difference factor to the second basic number of repetitions; and
determining the target number of repetitions from the second repetition number set according to the repetition number indication information contained in the DCI when the DCI is the non-acknowledged NACK-DCI includes:
determining a target difference factor from the second repetition number set according to the repetition number indication information contained in the DCI when the DCI is the non-acknowledged NACK-DCI, and determining the target number of repetitions by adding the target difference factor to the second basic number of repetitions.

In a possible implementation, each of the first repetition number set and the second repetition number set contains a difference factor with a numerical value being 0.

In a possible implementation, the quantity of difference factors larger than 0 in the first repetition number set is smaller than the quantity of difference factors larger than 0 in the second repetition number set.

To sum up, the apparatus for adjusting the number of resending times shown by the example of the present disclosure is applied to the user equipment, on the basis of the authorization-free scheduling mechanism, the uplink data are sent through the user equipment, and the DCI issued by the base station is received; the target number of repetitions is determined from the first repetition number set according to the repetition number indication information contained in the DCI when the DCI is the acknowledged ACK-DCI; the target number of repetitions is determined from the second repetition number set according to the repetition number indication information contained in the DCI when the DCI is the non-acknowledged NACK-DCI; and the number of resending times for new uplink data to be sent subsequently is adjusted to the target number of repetitions, so that different numbers of retransmissions may be determined according to different types of DCI, which achieves the reasonable adjustment of the number of repetitions, and improves the flexibility of setting the number of repetitions of the uplink data transmission of the user equipment.

An example of the present disclosure provides an apparatus for adjusting the number of resending times, the apparatus is applied to a base station and can implement all or a part of steps of the method shown in any example in FIG. 6, FIG. 7, FIG. 8 or FIG. 9. The above base station may be the access network device shown in FIG. 2. The apparatus for adjusting the number of resending times includes: a processor, and a memory configured to store an instruction executable by the processor.

The processor is configured to:
 obtain uplink data sent by user equipment on the basis of an authorization-free scheduling mechanism;
 issue downlink control information (DCI), where the DCI is acknowledged ACK-DCI or non-acknowledged NACK-DCI, the ACK-DCI is used for indicating a transmission success of the uplink data, and the NACK-DCI is used for indicating a transmission failure of the uplink data; and
 the DCI is used for indicating the user equipment to determine a target number of repetitions from a first repetition number set according to repetition number indication information contained in the DCI when the DCI is the acknowledged ACK-DCI, and
 determine a target number of repetitions from a second repetition number set according to repetition number indication information contained in the DCI when the DCI is the non-acknowledged NACK-DCI.

In a possible implementation, the first repetition number set is different from the second repetition number set.

In a possible implementation, the processor is further configured to:
 indicate a first number of repetitions and a second number of repetitions to the user equipment before issuing the downlink control information (DCI), so as to enable the user equipment to generate the first repetition number set according to the first number of repetitions by the set generation rule, and/or generate the second repetition number set according to the second number of repetitions by the set generation rule.

In a possible implementation, a repetition number relation is predefined in the user equipment and is a relation between the first number of repetitions and the second number of repetitions; and
 indicating the first number of repetitions and the second number of repetitions to the user equipment includes:
 the first number of repetitions is indicated to the user equipment, so as to enable the user equipment to obtain the second number of repetitions according to the first number of repetitions and the repetition number relation.

In a possible implementation, a repetition number relation is predefined in the user equipment and is a relation between the first number of repetitions and the second number of repetitions;
 indicating the first number of repetitions and the second number of repetitions to the user equipment includes:
 the second number of repetitions is indicated to the user equipment;

so as to enable the user equipment to obtain the first number of repetitions according to the second number of repetitions and the repetition number relation.

In a possible implementation, the processor is further configured to:
 indicate the first basic number of repetitions is indicated to the user equipment before issuing the downlink control information (DCI), so as to enable the user equipment to generate the first repetition number set according to the first basic number of repetitions by a first set generation rule, and/or generate the second repetition number set according to the first basic number of repetitions by a second set generation rule; where the first set generation rule is different from the second set generation rule.

In a possible implementation, each of the first repetition number set and the second repetition number set contains an initial number of repetitions, and the initial number of repetitions is the number of resending times configured when the base station performs authorization-free scheduling on the user equipment.

To sum up, the apparatus for adjusting the number of resending times illustrated by the example of the present disclosure is applied to the base station, the uplink data sent by the user equipment on the basis of the authorization-free scheduling mechanism are obtained through the base station, the DCI containing the repetition number indication information is issued, so that according to the DCI containing the repetition number indication information, the user equipment determines the target number of repetitions from the first repetition number set according to the repetition number indication information contained in the DCI when the DCI is the acknowledged ACK-DCI, and determines the target number of repetitions from the second repetition number set according to the repetition number indication information contained in the DCI when the DCI is the non-acknowledged NACK-DCI; and the number of resending times for new uplink data to be sent subsequently is adjusted to the target number of repetitions, so that different numbers of retransmissions may be determined according to different types of DCI, which achieves the reasonable adjustment of the number of repetitions, and improves the flexibility of setting the number of repetitions of the uplink data transmission of the user equipment.

The solutions provided by the examples of the present disclosure are introduced by taking the base station and the user equipment as examples above. It can be understood that the base station and the user equipment contain corresponding hardware structures and/or software modules for executing all functions so as to realize the above functions. In combination with the steps of the modules and an algorithm of each example described in the example of the present disclosure, the example of the present disclosure can be realized in a form of hardware or a combination of the hardware and computer software. Whether a certain function is executed in a form of hardware or computer software driving hardware depends on a specific application and a design constraint condition of the technical solutions. Those skilled in the art can implement the described functions in each specific application by using different methods, however, the implementation is not supposed to be regarded as exceeding the scope of the technical solutions of the examples of the present disclosure.

Figure 12:
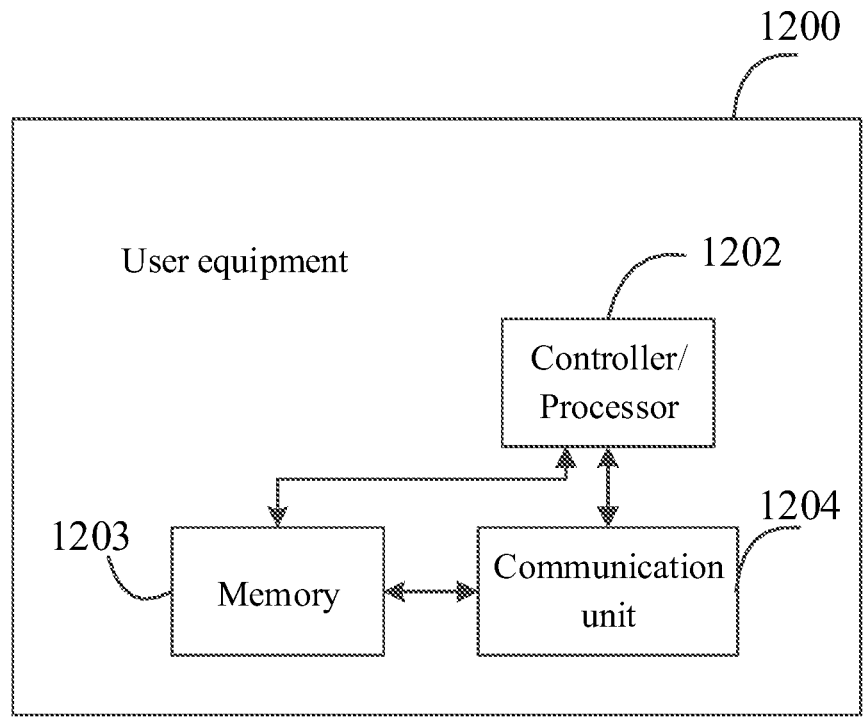
FIG. 12 is a schematic structural diagram of user equipment illustrated according to an example.

FIG. 12 is a schematic structural diagram of user equipment illustrated according to an example.

The user equipment 1200 includes a communication unit 1204 and a processor 1202. The processor 1202 may also be a controller, which is represented as "controller/processor 1202" in FIG. 12. The communication unit 1204 is configured to support communication between the user equipment and other network devices (for example, user equipment, other base stations, a gateway, etc.)

Furthermore, the user equipment 1200 may also include a memory 1203, and the memory 1203 is configured to store a program code and data of the user equipment 1200.

It can be understood that FIG. 12 shows a simplified design of the user equipment 1200. During actual application, the user equipment 1200 may contain any quantity of processors, controllers, memories, communication units, etc. All user equipment capable of realizing the examples of the present disclosure fall within the protection scope of the examples of the present disclosure.

Figure 13:
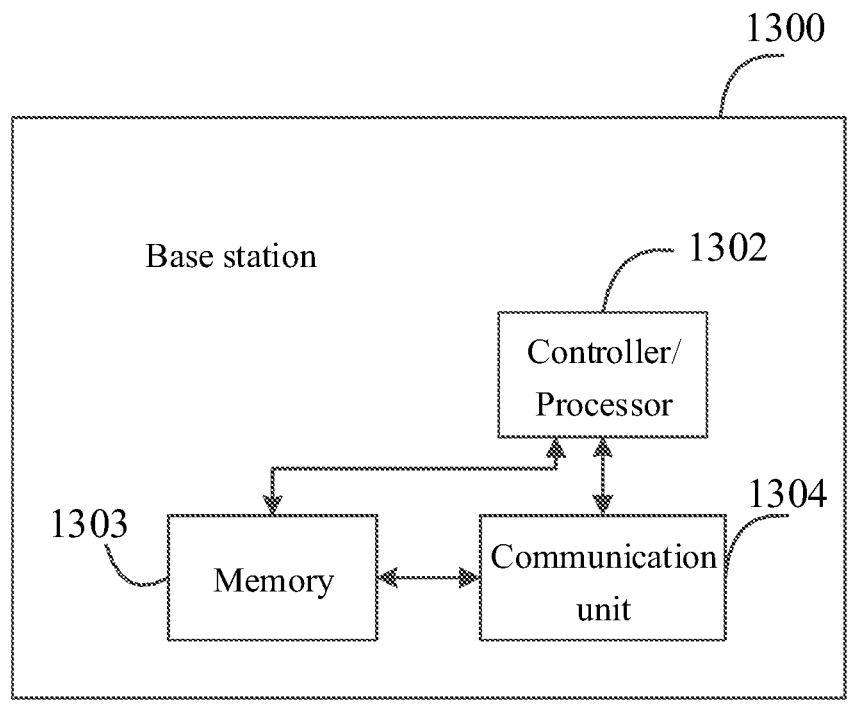
FIG. 13 is a schematic structural diagram of a base station illustrated according to an example.

FIG. 13 is a schematic structural diagram of a base station illustrated according to an example.

The base station 1300 includes a communication unit 1304 and a processor 1302. The processor 1302 may also be a controller, which is represented as "controller/processor 1302" in FIG. 13. The communication unit 1304 is configured to support communication between the base station and other network devices (for example, user equipment, other base stations, a gateway, etc.).

Furthermore, the base station 1300 may also include a memory 1303, and the memory 1303 is configured to store a program code and data of the base station 1300.

It can be understood that FIG. 13 shows a simplified design of the base station 1300. During actual application, the base station 1300 may contain any quantity of processors, controllers, memories, communication units, etc., and all base stations capable of realizing the examples of the present disclosure fall within the protection scope of the examples of the present disclosure.

Those skilled in the art may realize that in the above one or more examples, the described functions of the examples of the present disclosure may be realized by hardware, software, firmware or any of their combinations. When the software is adopted, these functions may be stored in a computer non-transitory readable storage medium or transmitted as one or more instructions or codes on the computer readable medium. The computer readable medium includes a computer storage medium and a communication medium, and the communication medium includes any medium which facilitates transport of a computer program from one place to another place. The storage medium may be any available medium which a general-purpose or special-purpose computer can access.

An example of the present disclosure further provides a computer non-transitory storage medium which stores at least one instruction, at least one program, a code set or an instruction set, and the at least one instruction, the at least one program, the code set or the instruction set is loaded and executed by a processor so as to implement all or a part of steps of any method for adjusting the number of resending times in FIG. 3, FIG. 7, FIG. 8 or FIG. 9.

An example of the present disclosure further provides a computer non-transitory storage medium which stores at least one instruction, at least one program, a code set or an instruction set, and the at least one instruction, the at least one program, the code set or the instruction set is loaded and executed by a processor so as to implement all or a part of steps of any method for adjusting the number of resending times in FIG. 6, FIG. 7, FIG. 8 or FIG. 9.

Those skilled in the art will easily figure out other implementation solutions after considering the specification and practicing the disclosure disclosed here. The present disclosure intends to cover any transformation, application, adaptive change of the present disclosure, which conform to a general principle of the present disclosure and include well-known common sense or conventional technical means in the technical field not disclosed in the present disclosure. The specification and examples are regarded as examples, and the true scope and the spirit are indicated by following claims.

It is understood that the present disclosure is not limited to an accurate structure already described above and shown in the drawings, and various modifications and changes can be made without departing from its scope.

Additional non-limiting embodiments of the disclosure include:

1. A method for adjusting a number of resending times, where the method is applied to user equipment of authorization-free scheduling and includes:
    sending uplink data;
    receiving downlink control information (DCI) issued by a base station, where the DCI is acknowledged ACK-DCI or non-acknowledged NACK-DCI, the ACK-DCI is used for indicating a transmission success of the uplink data, and the NACK-DCI is used for indicating a transmission failure of the uplink data;
    determining a target number of repetitions from a first repetition number set according to repetition number indication information contained in the DCI in response to determining that the DCI is the acknowledged ACK-DCI;
    determining a target number of repetitions from a second repetition number set according to repetition number indication information contained in the DCI in response to determining that the DCI is the non-acknowledged NACK-DCI; and
    adjusting the number of resending times for new uplink data to be sent subsequently to the target number of repetitions.

2. The method according to embodiment 1, where the first repetition number set is different from the second repetition number set.

3. The method according to any one of embodiments 1-2, where before receiving the downlink control information (DCI) issued by the base station, the method further includes:
    obtaining a first number of repetitions and a second number of repetitions indicated by the base station;
    generating the first repetition number set according to the first number of repetitions by a set generation rule; and/or
    generating the second repetition number set according to the second number of repetitions by the set generation rule.

4. The method according to embodiment 3, where a repetition number relation is predefined in the user equipment and is a relation between the first number of repetitions and the second number of repetitions; and
    obtaining the first number of repetitions and the second number of repetitions indicated by the base station includes:
    obtaining the first number of repetitions indicated by the base station; and
    obtaining the second number of repetitions according to the first number of repetitions and the repetition number relation.

5. The method according to embodiment 3, where a repetition number relation is predefined in the user equipment and is a relation between the first number of repetitions and the second number of repetitions; and obtaining the first number of repetitions and the second number of repetitions indicated by the base station includes:
obtaining the second number of repetitions indicated by the base station; and
obtaining the first number of repetitions according to the second number of repetitions and the repetition number relation.

6. The method according to any one of embodiments 1-2, where before receiving the downlink control information (DCI) issued by the base station, the method further includes:
obtaining a first basic number of repetitions indicated by the base station;
generating the first repetition number set according to the first basic number of repetitions by a first set generation rule; and/or
generating the second repetition number set according to the first basic number of repetitions by a second set generation rule; where
the first set generation rule is different from the second set generation rule.

7. The method according to any one of embodiments 3-6, where each of the first repetition number set and the second repetition number set contains an initial number of repetitions, and the initial number of repetitions is the number of resending times configured when the base station performs authorization-free scheduling on the user equipment.

8. The method according to any one of embodiments 1-2, where the first repetition number set and the second repetition number set contain a difference factor, and the difference factor is a difference between the adjusted number of resending times and a second basic number of repetitions;
determining the target number of repetitions from the first repetition number set according to the repetition number indication information contained in the DCI in response to determining that the DCI is the acknowledged ACK-DCI includes:
determining a target difference factor from the first repetition number set according to the repetition number indication information contained in the DCI in response to determining that the DCI is the acknowledged ACK-DCI, and obtaining the target number of repetitions by adding the target difference factor to the second basic number of repetitions; and
determining the target number of repetitions from the second repetition number set according to the repetition number indication information contained in the DCI in response to determining that the DCI is the non-acknowledged NACK-DCI includes:
determining a target difference factor from the second repetition number set according to the repetition number indication information contained in the DCI in response to determining that the DCI is the non-acknowledged NACK-DCI, and obtaining the target number of repetitions by adding the target difference factor to the second basic number of repetitions.

9. The method according to embodiment 8, where each of the first repetition number set and the second repetition number set contains a difference factor with a numerical value being 0.

10. The method according to any one of embodiments 8-9, where the quantity of difference factors larger than 0 in the first repetition number set is smaller than the quantity of difference factors larger than 0 in the second repetition number set.

11. A method for adjusting a number of resending times, where the method is applied to a base station of authorization-free scheduling and includes:
obtaining uplink data sent by user equipment; and
issuing downlink control information (DCI), where the DCI is acknowledged ACK-DCI or non-acknowledged NACK-DCI, the ACK-DCI is used for indicating a transmission success of the uplink data, and the NACK-DCI is used for indicating a transmission failure of the uplink data; and
the DCI is used for indicating the user equipment to determine a target number of repetitions from a first repetition number set according to repetition number indication information contained in the DCI in response to determining that the DCI is the acknowledged ACK-DCI, and determine a target number of repetitions from a second repetition number set according to repetition number indication information contained in the DCI in response to determining that the DCI is the non-acknowledged NACK-DCI.

12. The method according to embodiment 11, where the first repetition number set is different from the second repetition number set.

13. The method according to any one of embodiments 11-12, where before issuing the downlink control information (DCI), the method further includes:
indicating a first number of repetitions and a second number of repetitions to the user equipment, so as to enable the user equipment to generate the first repetition number set according to the first number of repetitions by a set generation rule, and/or generate the second repetition number set according to the second number of repetitions by the set generation rule.

14. The method according to embodiment 13, where a repetition number relation is predefined in the user equipment and is a relation between the first number of repetitions and the second number of repetitions; and
indicating the first number of repetitions and the second number of repetitions to the user equipment includes:
indicating the first number of repetitions to the user equipment, so as to enable the user equipment to obtain the second number of repetitions according to the first number of repetitions and the repetition number relation.

15. The method according to embodiment 13, where a repetition number relation is predefined in the user equipment and is a relation between the first number of repetitions and the second number of repetitions; and
indicating the first number of repetitions and the second number of repetitions to the user equipment includes:
indicating the second number of repetitions to the user equipment, so as to enable the user equipment to obtain the first number of repetitions according to the second number of repetitions and the repetition number relation.

16. The method according to any one of embodiments 11-12, where before issuing the downlink control information (DCI), the method further includes:
indicating a first basic number of repetitions to the user equipment, so as to enable the user equipment to generate the first repetition number set according to the first basic number of repetitions by a first set generation rule, and/or generate the second repetition number set according to the first basic number of repetitions by a second set generation rule, where
the first set generation rule is different from the second set generation rule.

17. The method according to embodiment any one of embodiments 13-16, where each of the first repetition number set and the second repetition number set contains an initial number of repetitions, and the initial number of repetitions is the number of resending times configured when the base station performs authorization-free scheduling on the user equipment.

18. An apparatus for adjusting a number of resending times, where the apparatus is applied to user equipment of authorization-free scheduling and includes:
a sending module, configured to send uplink data;
a receiving module, configured to receive downlink control information (DCI) issued by a base station, where the DCI is acknowledged ACK-DCI or non-acknowledged NACK-DCI, the ACK-DCI is used for indicating a transmission success of the uplink data, and the NACK-DCI is used for indicating a transmission failure of the uplink data;
a first determining module, configured to determine a target number of repetitions from a first repetition number set according to repetition number indication information contained in the DCI in response to determining that the DCI is the acknowledged ACK-DCI;
a second determining module, configured to determine a target number of repetitions from a second repetition number set according to repetition number indication information contained in the DCI in response to determining that the DCI is the non-acknowledged NACK-DCI; and
an adjusting module, configured to adjust the number of resending times for new uplink data to be sent subsequently to the target number of repetitions.

19. The apparatus according to embodiment 18, where the first repetition number set is different from the second repetition number set.

20. The apparatus according to any one of embodiments 18-19, where the apparatus further includes:
a first obtaining module, configured to obtain a first number of repetitions and a second number of repetitions indicated by the base station before the receiving module receives the downlink control information (DCI) issued by the base station;
a first generation module, configured to generate the first repetition number set according to the first number of repetitions by a set generation rule; and
a second generation module, configured to generate the second repetition number set according to the second number of repetitions by the set generation rule.

21. The apparatus according to embodiment 20, where a repetition number relation is predefined in the user equipment and is a relation between the first number of repetitions and the second number of repetitions; and
the first obtaining module includes:
a first obtaining sub-module, configured to obtain the first number of repetitions indicated by the base station; and
a second obtaining sub-module, configured to obtain the second number of repetitions according to the first number of repetitions and the repetition number relation.

22. The apparatus according to embodiment 20, where a repetition number relation is predefined in the user equipment and is a relation between the first number of repetitions and the second number of repetitions; and
the first obtaining module includes:
a third obtaining sub-module, configured to obtain the second number of repetitions indicated by the base station; and
a fourth obtaining sub-module, configured to obtain the first number of repetitions according to the second number of repetitions and the repetition number relation.

23. The apparatus according to any one of embodiments 18-19, further including:
a second obtaining module, configured to obtain a first basic number of repetitions indicated by the base station;
a third generation module, configured to generate the first repetition number set according to the first basic number of repetitions by a first set generation rule; and
a fourth generation module, configured to generate the second repetition number set according to the first basic number of repetitions by a second set generation rule; where
the first set generation rule is different from the second set generation rule.

24. The apparatus according to any one of embodiments 20-23, where each of the first repetition number set and the second repetition number set contains an initial number of repetitions, and the initial number of repetitions is the number of resending times configured when the base station performs authorization-free scheduling on the user equipment.

25. The apparatus according to any one of embodiments 18-19, where the first repetition number set and the second repetition number set contain a difference factor, and the difference factor is a difference between the adjusted number of resending times and a second basic number of repetitions;
the first determining module is configured to determine a target difference factor from the first repetition number set according to the repetition number indication information contained in the DCI in response to determining that the DCI is the acknowledged ACK-DCI, and obtain the target number of repetitions by adding the target difference factor to the second basic number of repetitions; and
the second determining module is configured to determine a target difference factor from the second repetition number set according to the repetition number indication information contained in the DCI in response to determining that the DCI is the non-acknowledged NACK-DCI, and obtain the target number of repetitions by adding the target difference factor to the second basic number of repetitions.

26. The apparatus according to embodiment 25, where each of first repetition number set and the second repetition number set contains a difference factor with a numerical value being 0.

27. The apparatus according to any one of embodiments 25-26, where the quantity of difference factors larger than 0 in the first repetition number set is smaller than the quantity of difference factors larger than 0 in the second repetition number set.

28. An apparatus for adjusting a number of resending times, where the apparatus is applied to a base station of authorization-free scheduling and includes:
an obtaining module, configured to obtain uplink data sent by user equipment; and
an issuing module, configured to issue downlink control information (DCI), where the DCI is acknowledged ACK-DCI or non-acknowledged NACK-DCI, the ACK-DCI is used for indicating a transmission success of the uplink data, and the NACK-DCI is used for indicating a transmission failure of the uplink data; and the DCI is used for indicating the user equipment to determine a target number of repetitions from a first repetition number set according to repetition number indication information contained in the DCI in response to determining that the DCI is the acknowledged ACK-DCI, and determine a target number of repetitions from a second repetition number set according to repetition number indication information contained in the DCI in response to determining that the DCI is the non-acknowledged NACK-DCI.

29. The apparatus according to embodiment 28, where the first repetition number set is different from the second repetition number set.

30. The apparatus according to any one of embodiments 28-29, further including:
   a first indication module, configured to indicate a first number of repetitions and a second number of repetitions to the user equipment before the issuing module issues the downlink control information (DCI), so as to enable the user equipment to generate the first repetition number set according to the first number of repetitions by a set generation rule, and/or generate the second repetition number set according to the second number of repetitions by the set generation rule.

31. The apparatus according to embodiment 30, where a repetition number relation is predefined in the user equipment and is a relation between the first number of repetitions and the second number of repetitions; and
   the first indication module includes:
   a first indication sub-module, configured to indicate the first number of repetitions to the user equipment, so as to enable the user equipment to obtain the second number of repetitions according to the first number of repetitions and the repetition number relation.

32. The apparatus according to embodiment 30, where a repetition number relation is predefined in the user equipment and is a relation between the first number of repetitions and the second number of repetitions;
   the first indication module includes:
   a second indication sub-module, configured to indicate the second number of repetitions to the user equipment, so as to enable the user equipment to obtain the first number of repetitions according to the second number of repetitions and the repetition number relation.

33. The apparatus according to any one of embodiments 28-29, further including:
   a second indication module, configured to indicate a first basic number of repetitions to the user equipment, so as to enable the user equipment to generate the first repetition number set according to the first basic number of repetitions by a first set generation rule, and/or generate the second repetition number set according to the first basic number of repetitions by a second set generation rule; where
   the first set generation rule is different from the second set generation rule.

34. The apparatus according to any one of embodiments 30-33, where each of the first repetition number set and the second repetition number set contains an initial number of repetitions, and the initial number of repetitions is the number of resending times configured when the base station performs authorization-free scheduling on the user equipment.

35. An apparatus for adjusting a number of resending times, including:
   a processor, and a memory configured to store an instruction executable by the processor; where
   the processor is configured to:
   send uplink data;
   receive downlink control information (DCI) issued by a base station, where the DCI is acknowledged ACK-DCI or non-acknowledged NACK-DCI, the ACK-DCI is used for indicating a transmission success of the uplink data, and the NACK-DCI is used for indicating a transmission failure of the uplink data;
   determine a target number of repetitions from a first repetition number set according to repetition number indication information contained in the DCI in response to determining that the DCI is the acknowledged ACK-DCI;
   determine a target number of repetitions from a second repetition number set according to repetition number indication information contained in the DCI in response to determining that the DCI is the non-acknowledged NACK-DCI; and
   adjust the number of resending times for new uplink data to be sent subsequently to the target number of repetitions.

36. An apparatus for adjusting a number of resending times, including:
   a processor, and a memory configured to store an instruction executable by the processor; where
   the processor is configured to load and execute the instruction executable to implement the method for adjusting the number of resending times according to any one of embodiments 11-17.

37. A computer non-transitory readable storage medium, where the storage medium stores at least one instruction, at least one program, a code set or an instruction set, and the at least one instruction, the at least one program, the code set or the instruction set is loaded and executed by a processor so as to implement the method for adjusting the number of resending times according to any one of embodiments 1-10.

38. A computer non-transitory readable storage medium, where the storage medium stores at least one instruction, at least one program, a code set or an instruction set, and the at least one instruction, the at least one program, the code set or the instruction set is loaded and executed by a processor so as to implement the method for adjusting the number of resending times according to any one of embodiments 11-17.

What is claimed is:

1. A method for authorization-free scheduling performed by a user equipment, the method comprising:
   sending uplink data;
   receiving downlink control information (DCI) issued by a base station, wherein the DCI is acknowledged ACK-DCI or non-acknowledged NACK-DCI, the ACK-DCI is used for indicating a transmission success of the uplink data, and the NACK-DCI is used for indicating a transmission failure of the uplink data; and
   adjusting a number of resending times for the user equipment to resend next uplink data based on the DCI, wherein the number of resending times is set to:
   a first target number of repetitions from a first repetition number set in response to determining that the DCI is the acknowledged ACK-DCI, and
   a second target number of repetitions from a second repetition number set in response to determining that the DCI is the non-acknowledged NACK-DCI;

wherein the method further comprises:
obtaining a first number of repetitions and a second number of repetitions indicated by the base station;
generating the first repetition number set according to the first number of repetitions by a set generation rule; and
generating the second repetition number set according to the second number of repetitions by the set generation rule.

2. The method according to claim 1, wherein the first repetition number set is different from the second repetition number set.

3. The method according to claim 1, wherein a repetition number relation is predefined in the user equipment and is a relation between the first number of repetitions and the second number of repetitions; and
obtaining the first number of repetitions and the second number of repetitions indicated by the base station comprises:
obtaining the first number of repetitions indicated by the base station; and
obtaining the second number of repetitions according to the first number of repetitions and the repetition number relation.

4. The method according to claim 1, wherein a repetition number relation is predefined in the user equipment and is a relation between the first number of repetitions and the second number of repetitions; and
obtaining the first number of repetitions and the second number of repetitions indicated by the base station comprises:
obtaining the second number of repetitions indicated by the base station; and
obtaining the first number of repetitions according to the second number of repetitions and the repetition number relation.

5. The method according to claim 1, wherein each of the first repetition number set and the second repetition number set contains an initial number of repetitions, and the initial number of repetitions is the number of resending times configured when the base station performs authorization-free scheduling on the user equipment.

6. The method according to claim 1, wherein the first repetition number set and the second repetition number set contain a difference factor, and the difference factor is a difference between the adjusted number of resending times and a second basic number of repetitions;
determining a first target difference factor from the first repetition number set according to repetition number indication information contained in the DCI in response to determining that the DCI is the acknowledged ACK-DCI, and obtaining the first target number of repetitions by adding the first target difference factor to the second basic number of repetitions; and
determining a second target difference factor from the second repetition number set according to repetition number indication information contained in the DCI in response to determining that the DCI is the non-acknowledged NACK-DCI, and obtaining the second target number of repetitions by adding the second target difference factor to the second basic number of repetitions.

7. The method according to claim 6, wherein each of the first repetition number set and the second repetition number set contains a difference factor with a numerical value being 0.

8. The method according to claim 6, wherein the quantity of difference factors larger than 0 in the first repetition number set is smaller than the quantity of difference factors larger than 0 in the second repetition number set.

9. An apparatus for authorization-free scheduling, comprising: a processor, and a memory configured to store an instruction executable by the processor; wherein the processor is configured to:
send uplink data,
receive downlink control information (DCI) issued by a base station, wherein the DCI is acknowledged ACK-DCI or non-acknowledged NACK-DCI, the ACK-DCI is used for indicating a transmission success of the uplink data, and the NACK-DCI is used for indicating a transmission failure of the uplink data,
adjust a number of resending times for the apparatus to resend next uplink data based on the DCI, wherein the number of resending times is set to:
a first target number of repetitions from a first repetition number in response to determining that the DCI is the acknowledged ACK-DCI, and
a second target number of repetitions from a second repetition number set in response to determining that the DCI is the non-acknowledged NACK-DCI;
wherein the processor is further configured to:
obtain a first number of repetitions and a second number of repetitions indicated by the base station;
generate the first repetition number set according to the first number of repetitions by a set generation rule; and
generate the second repetition number set according to the second number of repetitions by the set generation rule.

10. A non-transitory computer readable storage medium, storing instruction, the instruction when executed by a processor of a user equipment, cause the user equipment to perform the method according to claim 1.

* * * * *

UNITED STATES PATENT AND TRADEMARK OFFICE
CERTIFICATE OF CORRECTION

PATENT NO. : 12,445,255 B2
APPLICATION NO. : 17/774710
DATED : October 14, 2025
INVENTOR(S) : Qin Mu It is certified that error appears in the above-identified patent and that said Letters Patent is hereby corrected as shown below:

In the Specification

In Column 13, Line 12, delete "$R_{max0}½R_{max1}$" and insert -- $R_{max0}=½R_{max1}$ --, therefor.

In Column 29, Line 5, delete "embodiment any" and insert -- any --, therefor.

Signed and Sealed this
Twenty-seventh Day of January, 2026

John A. Squires
*Director of the United States Patent and Trademark Office*